United States Patent
Blackwell et al.

(10) Patent No.: US 7,490,319 B2
(45) Date of Patent: Feb. 10, 2009

(54) TESTING TOOL COMPRISING AN AUTOMATED MULTIDIMENSIONAL TRACEABILITY MATRIX FOR IMPLEMENTING AND VALIDATING COMPLEX SOFTWARE SYSTEMS

(75) Inventors: Barry Mark Blackwell, Knoxville, TN (US); Luis Reinaldo Guzman, Jr., Knoxville, TN (US); John Paul Collen, Appleton, WI (US); Barbara Marguerite Kokke, Menasha, WI (US); Anthony G. Irwin, Kaukauna, WI (US); Jeffrey D. Lindsay, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 736 days.

(21) Appl. No.: 10/980,920

(22) Filed: Nov. 3, 2004

(65) Prior Publication Data
US 2005/0166094 A1    Jul. 28, 2005

Related U.S. Application Data

(60) Provisional application No. 60/517,631, filed on Nov. 4, 2003.

(51) Int. Cl.
*G06F 9/44* (2006.01)
(52) U.S. Cl. ...................................... 717/124
(58) Field of Classification Search ............ 717/124
See application file for complete search history.

(56) References Cited

U.S. PATENT DOCUMENTS 5,557,539 A    9/1996    Fitch
5,655,074 A    8/1997    Rauscher
5,673,387 A    9/1997    Chen et al.
5,758,062 A    5/1998    McMahon et al.
5,781,720 A    7/1998    Parker et al.
5,949,999 A    9/1999    Song et al.
5,953,519 A    9/1999    Fura (Continued)

FOREIGN PATENT DOCUMENTS

EP    1 214 656 B1    5/2004

(Continued)

OTHER PUBLICATIONS

"SAP R/3 Overview", Feb. 19, 2002, http://web.archive.org/web/20020219155728/http://www.sapfans.com/sapfans/sapr3con.htm.*

(Continued)

*Primary Examiner*—Wei Y Zhen
*Assistant Examiner*—Chih-Ching Chow
(74) *Attorney, Agent, or Firm*—Alyssa A. Dudkowski

(57) ABSTRACT

The present invention relates to a testing tool for testing of complex software systems having a plurality of interrelated system components and a suite of test scenarios for testing the performance of the plurality of interrelated system components. The testing tool includes an Automated Multidimensional Traceability Matrix system for determining linkages between interrelated system components, a means for identifying a change in one or more of the interrelated system components, a means for applying the Automated Multidimensional Traceability Matrix, a means for executing all of or a subset of the test scenarios associated with the interrelated system components that may be affected by the change and a means for evaluating the results of the executed test scenarios.

22 Claims, 19 Drawing Sheets

U.S. PATENT DOCUMENTS

| | | | |
|---|---|---|---|
| 6,003,006 | A | 12/1999 | Colella et al. |
| 6,021,392 | A | 2/2000 | Lester et al. |
| 6,061,643 | A | 5/2000 | Walker et al. |
| 6,173,440 | B1* | 1/2001 | Darty ......................... 717/130 |
| 6,192,108 | B1 | 2/2001 | Mumford et al. |
| 6,216,109 | B1 | 4/2001 | Zweben et al. |
| 6,226,784 | B1 | 5/2001 | Holmes et al. |
| 6,279,826 | B1 | 8/2001 | Gill et al. |
| 6,301,701 | B1 | 10/2001 | Walker et al. |
| 6,339,745 | B1 | 1/2002 | Novik |
| 6,349,238 | B1 | 2/2002 | Gabbita et al. |
| 6,405,364 | B1 | 6/2002 | Bowman-Amuah |
| 6,415,369 | B1 | 7/2002 | Chodnekar et al. |
| 6,421,822 | B1 | 7/2002 | Pavela |
| 6,427,000 | B1 | 7/2002 | Mumford et al. |
| 6,601,233 | B1 | 7/2003 | Underwood |
| 6,694,509 | B1 | 2/2004 | Stoval et al. |
| 6,775,824 | B1 | 8/2004 | Osborne, II et al. |
| 6,801,818 | B2 | 10/2004 | Kopcha |
| 6,810,494 | B2 | 10/2004 | Weinberg et al. |
| 6,839,680 | B1 | 1/2005 | Liu et al. |
| 6,986,125 | B2* | 1/2006 | Apuzzo et al. .............. 717/124 |
| 6,993,748 | B2 | 1/2006 | Schaefer |
| 7,065,677 | B1* | 6/2006 | Hughes ....................... 714/38 |
| 2001/0049594 | A1 | 12/2001 | Klevans |
| 2002/0026630 | A1* | 2/2002 | Schmidt et al. ............. 717/103 |
| 2002/0072999 | A1 | 6/2002 | Andres et al. |
| 2003/0009396 | A1 | 1/2003 | Devries et al. |
| 2003/0018507 | A1 | 1/2003 | Flanagan |
| 2003/0033177 | A1 | 2/2003 | Macgonigle et al. |
| 2003/0078918 | A1 | 4/2003 | Souvignier et al. |
| 2003/0093478 | A1 | 5/2003 | Hughes |
| 2003/0097640 | A1 | 5/2003 | Abrams et al. |
| 2003/0154387 | A1 | 8/2003 | Evans et al. |
| 2003/0208351 | A1 | 11/2003 | Hartman et al. |
| 2004/0068714 | A1 | 4/2004 | Deimel et al. |
| 2004/0088602 | A1 | 5/2004 | Cohen et al. |
| 2004/0103396 | A1 | 5/2004 | Nehab |
| 2004/0154001 | A1* | 8/2004 | Haghighat et al. .......... 717/130 |

FOREIGN PATENT DOCUMENTS

| | | |
|---|---|---|
| WO | WO 95/16949 A1 | 6/1995 |
| WO | WO 97/12311 A2 | 4/1997 |
| WO | WO 01/16752 A1 | 3/2001 |
| WO | WO 01/71546 A2 | 9/2001 |
| WO | WO 01/71632 A2 | 9/2001 |
| WO | WO 01/71635 A2 | 9/2001 |
| WO | WO 02/23432 A1 | 3/2002 |
| WO | WO 2004/046891 A2 | 6/2004 |

OTHER PUBLICATIONS

Browne, Christopher, "SAP R/3—A 3 Tier Client/Server ERP System", pp. 1-2, Oct. 15, 2002, http://web.archive.org/web/20021015131732/http://cbbrowne.com/info/sap.html.*

Yanping Chen et al., "Specification-based Regression Test Selection with Risk Analysis", Sep. 2002 CASCON '02: Proceedings of the 2002 conference of the Centre for Advanced Study on Collaborative research, pp. 1-14.*

Eshel, Tamir, "Mercury Unveil TestSuite 4.0 for Automatic Testing of Client/Server Applications," Globes [online], Internet web page "http://www.globes.co.il/DocsEn/did=350578.htm", viewed and printed Aug. 31, 2004, 1 page.

Mar, Wilson, "Benefits, Pitfalls, and Strategies for Automated Testing," Internet web page "http://www.wilsonmar.com/1autotst.htm" viewed and printed Aug. 31, 2004, pp. 1-5.

Vicens, Carlos F., "Software Implementing an Automated Traceability Mechanism for Medical Device Software," *Medical Device & Diagnostic Industry Magazine*, originally published Feb. 1996, available at Internet web page "http://www.devicelink.com/mddi/archive/96/02/015.html", viewed and printed Aug. 31, 2004, pp. 1-4.

"AutoTester ONE® Special Edition for SAP™," Internet web page "http://www.autotester.com/content/pfv_soft_at1sap.htm", AutoTester, Inc., Dallas, Texas, viewed Aug. 31, 2004, 3 pages.

Bohner, Shawn A. and Robert S. Arnold, *Software Change Impact Analysis*, published by IEEE Computer Society Press, 1996, pp. 1-26, 67-81, and Chapters 3, 4, 5 (pp. 95-248), and 7 (pp. 299-356).

Dustin, Elfriede et al., *Automated Software Testing: Introduction, Management, and Performance*, published by Addison-Wesley, Reading, Massachusetts, 1999, pp. 76-89, 206-211, 293, 295-306, 417-473.

Hinquet, Bradley D. and A.F. Kelly, *SAP R/3 Implementation Guide: A Manager's Guide to Understanding SAP*, Macmillan Technical Publishing, 1998, pp. 1-50.

Kaner, C. et al., "Automated Acceptance and Regression Tests," *Testing Computer Software*, Wiley Computer Publishing, New York, 1999, pp. 191-197.

Keller, Gerhard and Thomas Teufel, "Trends in Management," *SAP R/3 Process-Oriented Implementation*, Section A, Addison Wesley Longman Limited, Harlow, England, 1998, pp. 1-32.

Kolaski, Dan, "Implementing an Effective Web Application Testing Process," a White Paper downloaded from Internet web page "http://www.empirix.com/NR/Empirix/NCResources/wp_wtm_testing_essentials_for_siebel7_deployments.pdf" on Oct. 7, 2003, Empirix, Boulder, Colorado, pp. 1-12.

Kolaski, Dan, "Testing Essentials for Siebel 7 Deployments," a White Paper downloaded from Internet web page "http://www.empirix.com/NR/Empirix/NCResources/wp_wtm_testing_essentials_for_siebel7_deployments.pdf" on Oct. 7, 2003, Empirix, Boulder, Colorado, pp. 1-12.

"Programming," Internet web page "http://www.mathworks.com/access/helpdesk/help/techdoc/matlab_prog/ch12_nd3.shtml", MathWorks, Inc., viewed prior to Nov. 2004, 1 page.

"Mercury Business Process Testing: Test Automation Focused on Your Business," a White Paper printed from Internet web page "http://itresearch.forbes.com/detail/RES/1092072586_637.html", by Mercury Interactive, Mountain View, California, published Aug. 1, 2004, pp. 1-13.

"Methodologies for Automated Testing," Internet web page "http://www.sqa-test.com/method.html", Automated Testing Specialists, Los Angeles, California, viewed prior to Nov. 2004, 12 pages.

Niemann, Thomas, "Visual Basic Collections and Hash Tables," available at Internet web page "http://epaperpress.com/vbhash/index.html", ePaper Press, first published in *Technical Guide to Visual Programming*, by Fawcette Technical Publications, 1999, pp. 1-10.

Norris, Grant et al., "What Will the R/3 Implementation Entail? An Executive Overview," Chapter 7, pp. 79-87, and "Understanding Enough About R/3 Functionality to Drive the Implementation Process," Chapter 16, pp. 177-209, *SAP—An Executive's Comprhensive Guide*, John Wiley & Sons, Inc., New York, 1998.

Oberniedermaier, Gerhard and Marcus Geiss, *Testing SAP R/3 Systems: Using the Computer Aided Test Tool*, published by Addison-Wesley, 2000, pp. 28-213.

Orso, Alessandro et al., "Leveraging Field Data for Impact Analysis and Regression Testing," *Proceedings of the Joint 9th European Software Engineering Conference (ESEC) & 11th SIGSOFT Symposium on the Foundations of Software Engineering (FSE-11)*, Helsinki, Finland, Sep. 1-5, 2003, edited by Paola Inverardi, The Association for Computing Machinery, ACM Order No. 594030, New York, 2003, pp. 128-137.

"Total Ownership Experience for PeopleSoft Enterprise," a White Paper available at Internet web page "http://www.peoplesoft.com/media/en/pdf/white_paper/enterprise_wp_1004.pdf", PeopleSoft, Inc., Pleasanton, California, Oct. 2004, pp. 1-39.

Perry, Dewayne E., "The Inscape Environment," *Proceedings of the 11th International Conference on Software Engineering*, IEEE Computer Society Press, Washington, D.C., The Institute of Electrical and Electronics Engineers, Inc., 1989, pp. 2-12.

"Rational ClearCase®," Internet web page "http://www-306.ibm.com/software/awdtools/clearcase/index.html", IBM, viewed Oct. 7, 2004, 1 page.

"Rational RequisitePro," Internet web page "www.rational.com/tryit/reqpro/seeit.jsp", IBM, viewed prior to Nov. 2004, 1 page.

"Rational Rose Data Modeler," Internet web page "http://www-306.ibm.com/software/awdtools/developer/datamodeler/", IBM, viewed prior to Nov. 2004, 1 page.

"Rational® Software," Internet web page "www-306.ibm.com/software/sw-bycategory/subcategory/rational/SW750.html", IBM, viewed Oct. 7, 2004, 1 page.

"SAPConsole Integration," Internet web page "http://www.peaktech.com/html/solutions/sap/sapconsole_integration.htm", Peak Technologies, viewed prior to Nov. 2004, 1 page.

"Serena RTM," Internet web page "http://www.serena.com/Products/rtm/home.asp", Serena Software, Inc., San Mateo, California, viewed Oct. 7, 2004, 1 page.

"Silk Test™", Internet web page "http://www.segue.com/products/funtional-regressional-testing/silktest.asp", Segue Software, Inc., Lexinton, Massachussetts, viewed Oct. 7, 2004, 2 pages.

"Telelogic Doors," Internet web page "http://www.telelogic.com/products/doorsers/doors/index.cfm", Telelogic North America, Inc., Irvine, California, viewed Oct. 7, 2004, 3 pages.

"Tool Kit for WinRunner®," Internet web page "http://www.sqa-test.com/toolkit.html", Automated Testing Specialists, Los Angeles, California, viewed prior to Nov. 2004, 6 pages.

Welti, Norbert, "Realization Phase," "Preparation Phase," "Productive Phase," and "Overall Project Phases," Chapters 5-8 of Successful SAP R/3 Implementation: Practical Management of ERP Projects, Addison Wesley Longman Limited, England, 1999, pp. 75-102.

Wieser, Oswald, "Integration of Process Control Systems and Laboratory Information Systems Into the Logistic Chain," *Automatisierungstehnische Praxis*, atp, 39, Feb. 1997, pp. 3, 26-28.

Yeager, Bob, "Mead's ERP System Integrates 'Best of Breed' Software," *PIMA's North American Papermaker*, vol. 82, Issue 4, Paper Industry Management Association, Information Access Company, Apr. 1, 2000, Dow Jones Reuters Business Interactive LLC (trading as Factiva®), pp. 1-5.

\* cited by examiner

TESTING TOOL COMPRISING AN AUTOMATED MULTIDIMENSIONAL TRACEABILITY MATRIX FOR IMPLEMENTING AND VALIDATING COMPLEX SOFTWARE SYSTEMS

The present invention relates to testing tools and aspects of testing tools for complex software systems. The present non-provisional application claims priority to U.S. patent application Ser. No. 60/517,631 filed on Nov. 4, 2003.

BACKGROUND OF THE INVENTION

Enterprise Resource Planning (ERP) software systems play a crucial role in the operation of many modern businesses, and include a wide variety of complex software systems. Examples include integrated systems such as those based upon the software systems of SAP AG (Walldorf, Germany), particularly the SAP R/3 (the standard business software offered by SAP), and related systems which feature a multilevel client/server system for enterprise-wide integration. Other examples of ERP software systems include the products of PeopleSoft Inc. (Pleasanton, Calif.), such as their Enterprise Human Capital Management system; Oracle (Redwood Shores, Calif.), such as their Oracle Enterprise Manager; SSA Global (Chicago, Ill.), such as their SSA ERP (LN) system and associated software; and Siebel (San Mateo, Calif.), such as their CRM On Demand customer relationship management system and other Siebel software. Such systems may comprise hundreds or thousands of modules that are interrelated. Implementing the complex software system often requires custom programming of numerous software modules to combine software from an external vendor with the existing systems of a corporation or other entity. When a component is modified in any way during or after implementation of the system, either by the user or by vendors of the various software modules, extensive testing is needed to ensure that the integrated system performs as desired. In the past, large amounts of human labor have been expended to manually keep track of the complex relationships between components of the integrated system to determine what tests need to be repeated when changes are made. Numerous errors can be made in this process, often resulting in unnecessary testing or missed defects in the total system. Many millions of dollars are lost due to the inefficiency of prior methods for testing integrated systems.

Implementation and integration of ERP software systems and other complex software systems often involves integrating new software modules from one or more vendors with existing "legacy" systems (a corporate system that existed and functioned before bringing in the complex system from the outside vendor), and may require custom programming of interfaces to allow the new and old systems to communicate and share data. For example, a legacy system for executing systems such as sales or inventory management software may need to convey information to programs of the external vendor. This may entail preparing custom interface programs (e.g., translation software) for translating the information from the legacy system for use in the complex system. For the combined software system, with interface modules, vendor-supplied software modules, and other software modules to be successfully integrated into a complex software system, extensive integration testing is needed to ensure that the components function as intended. However, merely testing the interface modules alone may be inadequate, for testing may also be needed for any modules that use data provided through the interface module to ensure that all needed data is provided in the right form for all modules that may depend on the provided data. If the relationships between the various modules in the complex software system are not thoroughly understood, the operator doing testing may either run too many test cases, testing elements of the complex software system that have not been affected by the new or updated interface, or may fail to run the right test cases needed to verify operation of one or more affected modules.

Unfortunately, the need for extensive testing continues as individual software modules are updated. Thus, in addition to the vast amount of testing needed to validate the operations of a complex system during phase-in, any of the numerous software modules from vendors may be updated, requiring additional testing to be conducted of the updated module and those that depend on it. The process of testing to ensure an update did not change existing processing (i.e., that previously functioning system still functions as expected) is often termed "regression testing." The process of determining what aspects of a complex software system are affected by a change in one or more software modules (or what aspects of a program are affected by a change in one or more portions of the code) is known as "impact analysis" or sometimes as "change analysis." An exemplary work on past developments in these areas is *Software Change Impact Analysis* edited by Shawn A. Bohner and Robert S. Arnold, Los Alamitos, Calif.: IEEE Computer Society Press, 1996. Chapters of particular interest include Chapter 3, "Automated Support for Impact Analysis"; Chapter 4, "Dependency-Analysis Approaches"; Chapter 5, "Traceability Approaches"; and Chapter 7, "Impact-Determination Techniques."

A variety of tools are known for automating several aspects of software testing. For example, integration and implementation of the Siebel 7 system (a customer relationship management software) is said to be assisted using tools from Empirix (Boulder, Colo.). This is described in the white paper, "implementing an Effective Web Application Testing Process" by Dan Kolaski, on Oct. 7, 2003. Principles of software testing for this system are also disclosed in the white paper, "Testing Essentials for Siebel 7 Deployments" Dan Kolaski, on Oct. 7, 2003. Generally, typical tools for automated testing include capture and playback tools for generating scripts to simulate user actions, and testing tools that can observe the actions of the software in response to automatically executed scripts.

One tool used for software testing is REQUISITEPRO® software of IBM. Other tools are marketed, for example, by Mercury Interactive (Mountain View, Calif.), such as MERCURY BUSINESS PROCESS TESTING™ software or MERCURY TEST DIRECTOR™ software; Segue Software, Inc. (Lexington, Mass.), such as their SILKTEST® software for regression and functional testing; and Empirix Inc. (Waltham, Mass.), whose E-TESTER™ software is used for providing automated functional and regression testing for Web applications, and is said to record the objects on every web page visited and automatically inserts test cases to validate the objects.

Another example of a tool for automated regression testing is described in U.S. Pat. No. 6,427,000, "Performing Automated Testing Using Automatically Generated Logs," issued Jul. 30, 2002 to Mumford et al., herein incorporated by reference to the extent it is noncontradictory herewith. The Mumford et al. patent is said to disclose a system that performs automated testing on service applications using automatically generated logs, so that new testing applications do not need to be created for each new release of a service application. Mumford et al. further provide for testing of the service application by accounting for all data and processes performed, without interfering with the processing of the service application. An Automated Regression Tester (ART) captures and records data generated by the execution of an initial version of a service application. This data is recorded to a first test log. When a new or ported version of that service application is developed, the first test log is used by the ART to generate output that emulates the operating environment, including caller and user input, of the service application. The processing of the new/ported version of the service application is captured and recorded to a second test log. The ART then compares the second test log to the first test log and reports any discrepancies in data. Such discrepancies may indicate a bug in the new/ported version of the service application.

Another automated tool is described in U.S. Pat. No. 6,694,509, "Automated Regression Testing of Workstation Software," issued Feb. 17, 2004 to Stoval et al., herein incorporated by reference to the extent it is noncontradictory. The Stoval patent discloses a method and means for maintaining a library of test scripts for use in regression testing application programs. More particularly, a test directory tree is maintained which is a mirror image of a source directory tree that is used to compile the executable code for the application program. The test directory tree indicates the test scripts which are to be used in regression testing executable code compiled from corresponding entries in the same directory trees. Also see U.S. Patent Publication No. US20040088602A1, "Automated Recording and Replaying of Software Regression Tests," published May 5, 2004 by Cohen and Vollers, herein incorporated by reference to the extent it is noncontradictory herewith.

For implementation of SAP® systems, one commonly used tool is the Computer Aided Test Tool (CATT) that falls into the category of Computer Aided Software Engineering (CASE) tools. CATT is integrated into the ABAP Development Workbench of SAP® software. CATT allows those working with SAP® software to automate test flows, based on precisely defined input (batch input). After tests are run with CATT the R/3 System can automatically create a run log that is archived and serves as the basis for documentation of various test results. The test results can then be examined to evaluate the quality of the system. CATT can be used as tool to assist in the execution of the present invention. For example, it can be used to capture keystrokes and insert data to automatically execute the test case instead of having a person manually execute the transaction and fill in the data. The use of CATT for SAP® software is described in detail in Gerhard Oberniedermaier and Marcus Geiss, *Testing SAP R/3 Systems: Using the Computer Aided Test Tool*, transl. Jason M. Miskuly, Harlow, England: Addison-Wesley, 2000 (see particularly pages 28-213).

General principles for automated software testing are described on the Web pages of Automated Testing Specialists (Los Angeles, Calif.). Described therein is the Functional Decomposition Method, in which script development methodology is used to reduce all test cases to their most fundamental tasks. User-defined functions, business function scripts, and "sub-routine" or "utility" scripts perform these tasks independently of one another. Automated test scripts can be written for a business function, using data-files to provide both the input and the expected-results verification. A hierarchical architecture is employed, using a structured or modular design. Also described is the "Test Plan Driven" method, in which the entire testing process is data-driven, including functionality. The test plan is prepared in a specific format that pre-written "utility" scripts use to control the processing of the automated test. Hybrid methodologies can also be used, including the ATS Toolkit for WINRUNNER® software.

Guidelines for software testing in general are discussed by C. Kaner, J. Falk, and H. Q. Nguyen in *Testing Computer Software* (New York: Wiley Computer Publishing, 1999). Automated regression testing is discussed on pages 191-197. Principles of automated software testing are also described in detail by Elfriede Dustin, Jeff Rashka, and John Paul, *Automated Software Testing* (Boston: Addison-Wesley, 1999, pages 293 and 295-306).

Impact analysis, known as the effect of changes in one software segment on other software segments, is known. Recent advances in impact analysis are described by A. Orso, T. Apiwattanapong, and M. J. Harrold, "Leveraging Field Data for Impact Analysis and Regression Testing," *ESEC/FSE'03* (*Foundations of Software Engineering: Proceedings of the 9th European Software Engineering Conference held jointly with the 10th ACM SIGSOFT International Symposium on Foundations of Software Engineering*), Sep. 1-5, 2003, Helsinki, Finland, printed by ACM (Association for Computing Machinery), New York, 2003, pp.128-137. Background information on impact analysis is provided by Shawn A. Bohner and Robert S. Arnold in "An Introduction to Software Change Impact Analysis," in *Software Change Impact Analysis* (Los Alamitos, Calif.: IEEE Computer Society Press, 1996, pp. 1-26), herein incorporated by reference. Bohner and Robert refer to software life-cycle objects (SLOs) that include all aspects of a software project from specifications to finished programs and-they discuss the effects of making changes in the software. They note that changes in software design can be needed for many purposes, such as changes in requirements and specifications, design trade-offs, interface changes, performance problems, feedback from prototypes, etc. Changes in programs themselves can be the result of bug fixes, algorithm adjustments, data structure modifications, parameter changes, etc. In dealing with such changes, there is a need to analyze the impact of the change on other components of the system and the impact on the requirements and objectives for the software. Among known tools, Bohner and Arnold list the Dependency Analysis Tool Set developed by Norman Wilde at the University of West Florida "to assist in understanding the complex interrelationships found in large systems developed in C." They also discuss Alicia, an impact analysis tool developed by the Air Force.

Also known in the art is the concept of a traceability matrix, which is known as a way of keeping track of the software modules, documents, etc., that are used to support objectives of the software. In the prior efforts, the traceability matrix was generally created manually, and did not contain detailed information about multiple levels of dependencies and complex interrelationships between components. Rather, known traceability matrices present what superficial, first-order (single level) view of basic relationships between software requirements or specifications and the software modules.

In general, the challenge of testing software modules to validate the operations of complex software systems such as an Enterprise Resource Planning system can easily represent one of the most difficult, costly, and man-power intensive activities within an organization. Consequently, there is a need for methods to improve the process of testing software modules and to streamline such processes. Reduction of redundant testing and elimination of unneeded test runs is desirable, but is not presently available.

In spite of the prior recognition of the need to construct a "modularity-relationship analysis," past efforts appear to have been dominated by manual approaches to dealing with such analyses. Automated tools for regression testing that exploit a Traceability Matrix do not appear to be known, nor do there appear to be known tools that automatically generate a "roadmap" of the relationships between software modules to identify the test cases that need to be included in a regression test.

While manual or computer-based requirement tracking tools exist for relating software objectives to the modules that deliver the objectives, these tools generally do not provide detailed information on multiple levels of dependency between modules or other components of a complex software system. Indeed, while many tools have been developed to assist in the analysis of individual software programs or to automate various aspects of testing of complex software system (e.g., the CATT tool used to assist SAP implementation), there remains a need for improved automated tools for complex software systems to make testing more efficient and to solve many of the problems associated with implementing complex software systems, particularly when software from multiple vendors, including legacy components, must be integrated.

While others have proposed the use of test cases and scripts for automated software testing, sometimes in conjunction with a conventional traceability matrix, the ability to efficiently select which test cases need to be run in response to a given software modification has generally been lacking. There is a need for an improved automated software tool that allows the complex interrelationships between software modules and test cases to be identified automatically, allowing an operator to make a much more efficient determination of what fraction of the test cases need retesting. There is also a need for a tool to assist software testing that can take advantage of the data in a Traceability Matrix to provide automated roadmaps of relationships between affected test cases in order to more efficiently select test cases needed for proper testing following a change in one or more software modules or other system components.

SUMMARY OF THE INVENTION

An automated software tracking and testing tool comprised an Automated Multidimensional Traceability Matrix has been developed to keep track of the complex relationships between various components of complex software system and to assist in the regression testing needed in the integration and subsequent modification of the complex software system. The Automated Multidimensional Traceability Matrix is used to store the relationship information between test cases (predetermined scenarios involving a series of specified transactions to test the behavior of one or more software components of the complex software system) and/or the individual components of the complex software system. When a component is modified, information in the Automated Multidimensional Traceability Matrix (sometimes referred to herein as the "Traceability Matrix" or abbreviated in some figures as "T.M.") is then accessed to automatically generate a list of test cases that may need to be run to efficiently test the functioning of the complex software system. (If desired, smaller subsets of the listed test cases may be created by further automated screening processes or based on operator judgment.) The automated tool of the present invention is particularly useful for implementing and updating ERP systems such as SAP-based systems and automated data collection (ADC) systems offering the ability to obtain real-time information such as information about manufacturing processes, products in the supply chain, sales, etc. Other complex software systems can also be treated, including distributed control systems, telecommunications systems, financial analysis systems, logistics systems, intelligent manufacturing systems, etc.

The automated tool can also provide information about the documentation associated with the various components of the complex software system, to indicate when documentation for a modified components as well as any related components may need review to ensure that it is up-to-date after revision of one or more components of the complex software system.

The testing system of the present invention can include a variety of features, including automatically determining and tracking linkages between complex software system components, automatically producing reports to show what test cases need further testing, identifying what test cases from previous work were affected by a modification to the system, and enabling auditing of changes (generating documentation) to ensure compliance with internal requirements or regulatory requirements, while providing such support for non-regulated areas as well. Further, the automated tool may be configured to automatically detect discrepancies between expected results and actual results when a test case is run, and optionally to identify automatically what modules may need revision to correct the discrepancies.

In one embodiment, the automated testing tool of the present invention can be described as a testing tool for streamlined testing of complex software systems having a plurality of interrelated system components and a suite of test scenarios for testing the performance of the plurality of interrelated system components, the testing tool comprising:

a) an Automated Multidimensional Traceability Matrix system for determining linkages between interrelated system components, adapted to specify a subset of interrelated system components linked to a predetermined selection of one or more components through one or more chains of dependencies and tributaries;

b) means for identifying a change in one or more of the system components;

c) means for applying the Automated Multidimensional Traceability Matrix, in response to identification of a change in one or more of the system components, to determine which of the interrelated components may be affected by the change;

d) means for automatically executing all of or a subset of the test scenarios associated with the interrelated components that may be affected by the change;

e) means for evaluating the results of the executed test scenarios.

In the testing tool, the means for identifying a change in one or more of the system components may be automated or partially automated, and may include an electronic tool such as a file scanner that detects a change in an executable file (binary code comparators, for example, or software that examines creation dates, file size, checksum scores, timestamp parameters, etc.) or that detects a similar or other change in a data set, a script, a database record, a document modification date, and so forth. Programs for such purposes are well known in the art. Means for identifying a change in one or more of the system components may also include manual entering of information about the change.

In the testing tool, means for evaluating the results of the executed test scenarios may include manual comparison of output information to previously generated output information from the test scenarios prior to the change, or automated or semi-automated comparison of files using well-known computer programs for that purpose. Means for evaluating the results of the executed test scenarios may include computer-executed comparison of output information to previously generated output information from the test scenarios prior to the change (e.g., changes relative to a baseline).

The testing tool may be adapted for implementation of SAP R/3, and may further include use of a Computer Assisted Test Tool to automatically execute selected scripts. In this testing tool, the complex software system may include software from at least one vendor interfaced with legacy software written by at least one other party and provided through at least one other vendor. In this testing tool, the complex software system may be an ERP system. This testing tool may further include means for auditing changes in software and documentation associated with the software, including electronic communication with an Administrative Entity.

In another embodiment, the present invention can be described as a testing tool for automatically selecting a subset of test scripts from a body of test scripts for at least one of integration testing or system testing of a complex software system, wherein the test scripts are adapted to guide execution of associated test cases for testing the corresponding software components. In this embodiment, the testing tool comprises:
  a) an Automated Multidimensional Traceability Matrix system for defining linkages between test cases;
  b) a graphical user interface for receiving information about linkages between test cases, said information being fed by the graphical user interface to the Automated Multidimensional Traceability Matrix system;
  c) means for graphically displaying parent-child relationships between test cases at a plurality of levels, said parent-child relationships being automatically determined based on the information in the Automated Multidimensional Traceability Matrix system;
  d) means for selecting a subset of the test cases for testing of multiple components in the complex software system in response to a change in one or more of the test cases of the complex software system; and
  e) means for executing the test scripts associated with said subset of test cases; and
  f) means for evaluating the status of the complex software system based on output generated by the executed test scripts.

In another embodiment, the testing tool comprises a graphical user interface for improved efficiency in the testing of a complex system software systems having a plurality of interrelated programs and a suite of test cases for testing the performance of the plurality of interrelated programs, the graphical user interface comprising:
  a) means for displaying output information from an Automated Multidimensional Traceability Matrix about the linkages between a selected portion of a plurality of interrelated programs, said means being adapted to display linkages across three or more levels of dependency, said output information comprising at least one of the following:
    1) a list of dependencies and tributaries for the selected program; and
    2) a list of test cases that can invoke the selected program;
  b) means for receiving input information the Automated Multidimensional Traceability Matrix about the linkages between a selected portion of a plurality of interrelated programs; and
  c) communication means to pass input and output information from the graphical user interface to at least one server hosting the Automated Multidimensional Traceability Matrix.

In another embodiment, the present invention comprises a computer readable medium containing instructions for controlling a computer system to perform a method of automatically selecting a subset of test cases from a body of test cases for efficient testing of the performance of a complex software system comprising a plurality of software components. Each test case is associated with at least one software component in the complex software system and each test case is also associated with a script providing a series of instructions to be executed by the complex software system for the test case. The method can comprise:
  a) displaying a graphical user interface to receive input information about dependencies and tributaries for the test cases;
  b) storing said input information in a database associated with a Automated Multidimensional Traceability Matrix;
  c) receiving a change notice indicating that one or more of the software components have been changed;
  d) applying the Automated Multidimensional Traceability Matrix to determine which of the test cases are linked via previously defined linkages to the one or more of software components that have been changed;
  e) displaying information to indicate which test cases are linked to the to the one or more of software components that have been changed;
  f) selecting all or a subset of the linked test cases from step (e), either automatically or in response to a user selection;
  g) executing the scripts associated with the selected linked test cases from step (f); and
  h) storing results of the executed test scripts for later comparison with expected results for the executed test scripts.

The computer readable medium can comprise one or more servers, a hard disk, a CD-ROM, a tape drive, magnetic media, optical media, and the like, as well as signals and wave functions capable of containing the computer instructions.

In another embodiment, the present invention comprises a method for user testing of updated software modules for complex software system comprising a plurality of integrated software modules provided by one or more vendors. This method may comprise:
  a) receiving a software update for a first software module from a vendor;
  b) installing the software update on a server to provide an updated first software module in the ERP system;
  c) applying a Automated Multidimensional Traceability Matrix to automatically create a list of software modules from the plurality of software modules whose performance is linked to the updated first software module, or a list of the test cases associated with the software modules whose performance is linked to the updated first software module;
  d) selecting a subset of the list in step (c) and executing the associated test scripts;
  e) evaluating the results of the executed test scripts to determine if the complex software system is properly functioning.

The testing tools of the present invention can be integrated with any other known software testing tools to aid in debugging or otherwise identifying or resolving problems. For example, Dustin et al. in *Automated Software Testing* (Boston: Addison-Wesley, 1999, pp. 76-89 and pp. 417-473, herein incorporated by reference) describe many other tools used at various stages of software testing, including visual modeling, syntax checkers, memory leak detection tools, runtime error detection tools, source code testing tools, static and dynamic analyzers, metrics tools for identifying untested code, GUI testing tools, simulation tools, network testing tools, load/performance testing tools, and the like.

The present invention also relates to a computer data signal embodied in a carrier wave. The computer data signal includes information defining tributary relationships and dependency relationships between at least one of a plurality of software modules in a complex software system and a plurality of computer-implemented test cases for regression testing of interrelated software modules in a complex software system. The computer data signal may also include instructions for a computer system to graphically convey information about the tributary relationships and the dependency relationships, wherein individual test cases or software modules are represented in a manner that indicates their relationships to one another, and wherein the information displayed can indicate which other test cases or software modules may be affected by changes. The information may be graphically conveyed using a graphic user interface. Additionally, the computer data signal may include instructions for displaying additional information about selected individual test cases or software modules in response to a predetermined user action in association with a user action relative to the graphical user interface. Further, the computer data signal may include instructions providing means for electronically selecting test cases or software modules from the conveyed information on the graphical user interface for subsequent testing.

The computer data signal may further include baseline information from a predetermined collection of input data sets, associated test cases, and validated output results. The computer data signal may also include instructions for initiating manual or automatic execution of the selected test cases or software modules, and instructions for electronically storing output results from the executed test cases or software modules. Separately, the computer data signal may include instructions for comparing the output results with the baseline information. The computer data signal may include instructions for automatically identifying discrepancies between the output results and the baseline information, and instructions for automatically identifying one or more recommended actions to rectify the discrepancies. In an additional aspect, the computer data signal may include instructions for filtering out date-specific discrepancies between the output results and the baseline information. The computer data signal may include instructions for execution of computerized debugging tools to identify the source of the discrepancies.

In an additional aspect, the computer data signal may include information about a plurality of human testers and instructions for scheduling testing work by one or more of the testers in response to a user selecting test cases or software modules from the conveyed information on the graphical user interface for subsequent testing. Additionally, the computer data signal may include instructions to allow a user to modify the information defining the tributary relationships and dependency relationships between at least one of the plurality of software modules in the complex software system and the plurality of computer-implemented test cases. The computer data signal may include instructions for communicating with an Administrative Entity such that information is provided to the Administrative Entity describing testing activity and software modifications, and further including instructions requiring a user to obtain permission from an agent associated with the Administrative Entity prior to making the change in a software module, wherein the obtaining of permission is also recorded with the Administrative Entity.

In a further aspect of the present invention, the computer data signal may include instructions for automatic execution of one or more of the selected test cases or software modules. The complex software system may include over 100 software modules, the software modules being provided by two or more vendors. Separately, the complex software system may include over 500 software modules, the software modules being provided by three or more vendors. The complex software system may include interfaces with two or more distinct computer operating systems from two or more vendors, the distinct operating systems being on two or more servers. The complex software system may include SAP software. Additionally, the graphically conveyed information about the tributary relationships and dependency relationships may be provided in a hierarchical form. The graphically conveyed information about the tributary relationships and dependency relationships may be provided in a hierarchical form including at least one of folder icons, document icons, icons with "plus" symbols, icons with "minus" symbols, page icons and arrow icons. The graphically conveyed information may further include hyperlinks to provide additional information about a selected test case or software module.

Definitions

The following terms are briefly defined to clarify there use herein. More detailed descriptions may be provided in the subsequent description of the invention.

As used herein, the term "auto capture" refers to a component that facilitates the creation of test cases for transactions by monitoring the performance of the test in the transaction itself. That is to say, auto capture observes the behavior of the test operator and creates a test case that performs or replicates the same behavior.

As used herein, the term "auto compare" refers to a component that compares two test reports and produces a difference report therefrom. Additional capability is also included within the auto compare component enabling filtering or customization of the output generated in the difference report.

As used herein, the term "client server" describes the relationship between two software processes, in which a client computer requests a service to be performed by a server computer. The server computer executes the server and then transmits results back to the client. A client and server system may operate on a single machine, but typically client server operations involve separate computers joined via a network.

As used herein, the term "complex software system" refers to any software system comprising a plurality of interrelated modules that need to be integrated when implemented by a user. Complex software systems typically comprise modules from two or more sources, such as a combination of modules from a vendor plus one or more legacy systems from other vendors or systems that were developed in-house at a corporation, and/or application software from two or more sources (not including the basic operating system software, such as MICROSOFT WINDOWS® software, LINUX® software, and the like), such as commercial software from one or more vendors and customized software prepared by a user. By way of example, a complex software system may comprise about 20 or more distinct software modules, such as about 50 or more, 100 or more, 500 or more, 1000 or more, or 3000 or more software modules. Also by way of example, the complex software system may comprise commercial software provided by two or more vendors, three or more vendors, five or more vendors, or ten or more vendors. The complex software system may comprise software modules written in any number of different computer languages (e.g., FORTRAN, COBOL, C++, PASCAL. Visual Basic 6, assembly code, XML, Javascript, etc.), such as two or more languages, three or more languages, or four or more languages. The compiled code for the complex software system may have a total file size of at least about 10 megabytes, such as about 50 megabytes or greater, 100 megabytes or greater, 300 megabytes or greater, or 500 megabytes or greater. The modules can include software that executes particular business functions, interface software, telecommunications software, reporting software, financial software, etc., including ERP systems. Exemplary ERP systems include those marketed by suppliers such as SAP (Newtown Square, Pa.), JD Edwards (Denver, Colo.), Manugistics (Rockville, Md.), Siebel Systems (San Mateo, Calif.), or ROI Systems (specifically, the Manage 2000® system of ROI Systems, Minneapolis, Minn.), as well as custom built systems.

As used herein, the term "control test report" refers to a version of a test case's test report that contains the correct or favorable results. In the present invention, when a regression test is executed, the report resulting from the test case in question may be compared with an output defined as the control test report.

As used herein, the term "data maker" refers to a component that employs rules defined by a test operator to create volume test data for use in a thorough testing of a transaction.

As used herein, the term "dependency" refers to a test case that precedes another test case because of a sequence in events or data requirement.

As used herein, the term "design specification" refers to a specification that documents how a system is to be built. It typically includes system or component structure, algorithms, control logic, data structures, data set [file] use information, input/output formats, interface descriptions, etc.

As used herein, the term "difference report" refers to the output generated from the auto compare process. Such difference reports enumerate the differences between auto test reports including any filters invoked during the compare process.

As used herein, the term "regression test" refers to a repeatable test that thoroughly exercises the components it tests and produces output that, when analyzed, verifies the correctness of the component or transaction.

As used herein, a "script" is a written description of the set of transactions to be executed in a test case and a list of expected results for comparison to the actual results. A script is typically associated with each test case, and may be displayed via a Test Case Catalog Maintenance Form (described hereafter) or be accessible from a link or other means from the Test Case Catalog Maintenance Form. The instructions for transactions to execute in a script may be written in descriptive terms to tell a human operator what transactions to execute, or it may comprise or access computer instructions to automatically execute the transactions, or may comprise any combination of computer-executed and human executed instructions. Computer instructions may be in any form, such as Java Script, Visual Basic code, Pascal, Fortran, C++, any known macro language, and the like. In one embodiment, the script comprises or consists of a text-based document such as a Microsoft Word document or text file that is accessible from a graphical user interface display of the Test Case Catalog Maintenance Form for a particular test case.

As used herein, the term "template" refers to a suggested format for recording required information.

As used herein, the term "test incident report" refers to a document reporting on any event that occurs during testing that requires further investigation. Some sources use the alternate expression "deviation form."

As used herein, a "test plan" refers to documentation specifying the scope, approach, resources, and schedule of intended testing activities. It identifies test items, the features to be tested, the testing tasks, responsibilities, required resources, and any risks requiring contingency planning. Test plans can be constructed with the help of project planning tools and scheduling tools, including, for example, the tool discussed in U.S. Pat. No. 6,216,109, "Iterative Repair Optimization with Particular Application to Scheduling for Integrated Capacity and Inventory Planning," issued Apr. 10, 2001 to Zweben et al., herein incorporated by reference to the extent it is noncontradictory herewith.

As used herein, the term "testing" generally refers to the process of operating a system or component of a complex software system under specified conditions, observing or recording the result, and marking an evaluation of some aspect of the system or component. Such testing can be in the context of integration testing on the performance of multiple components working together, or system testing of the entire complex software system to check the collaboration between subsystems. Testing can include regression testing to check for errors in previously functioning modules or systems that were introduced during software development or maintenance. By way of example only, other testing types may include the following:

Integration Testing—(1) Testing conducted to determine whether or not a system satisfies its acceptance criteria and to enable the customer to determine whether or not to accept the system. (2) The process of testing an integrated hardware and software system to verify the system meets its specified requirements.

Load Testing—Load testing can also be done to examine system performance during system stress, when work loads are high and resources may be low. Load testing (sometimes called stress testing) can be considered in the scope of the present invention. Scripts can be provided to run many features of the system to simulate a high load, while testing the function of various modules. For example, automated tools may create a number of virtual users, generate large queries and numerous transaction sets, etc.

Unit Testing—(1) Testing of a module for typographic, syntactic, and logical errors, for correct implementation of its design, and for satisfaction of its requirements. (2) Testing conducted to verify the implementation of the design for one software element.

As used herein, the term "test case" refers to a defined set of inputs for a component or transaction that generates a defined set of outputs. Generally, a test case includes documentation specifying inputs, predicted results, and a set of execution conditions for a test item. The test case can be viewed as a predetermined collection of one or more transactions involving one or more software module. It may involve a series of transactions executed in a predetermined order specified in a test case script to simulate actual uses of a complex software system. Each transaction executed may be represented by individual test cases that can be strung together to represent more complex sequences of actions within a larger test case (a parent case). In many embodiments, when test cases are executed, errors that are detected point to areas needing repair in the software or in whatever components are being examined in an interrelated system.

As used herein, the term "test report" refers to an output generated from the execution of a test case.

As used herein, the term "test case characteristic" refers to information about the test case (such as date and resource assignments) used to assist in the development and unit tests of the test case. The characteristic can be viewed as a first level plan to assist in building the components of a catalog of test cases.

As used herein, the term "traceability" refers to the degree to which a relationship can be established between two or more products of the development process, especially products having a predecessor-successor or master-subordinate relationship to one another, e.g., the degree to which the requirements and design of a given software component match. (Note that in many prior art sources, "traceability" is often used in another sense, referring to tracing the function of a software module to the objectives or requirements satisfied by the software; in other words, establishing the reason for the existence of the software.)

As used herein, a "transaction" is a fundamental executable block for carrying out a specific task or function, typically business actions executed by a unit of software such as a single software module. Typically, a transaction is a step in a larger business process.

As used herein, the term "tributary" refers to a test case that follows a test case because of a sequence in events or data requirement. Therefore, a tributary can be considered as the inverse of a dependency. In other words, if a first case is a dependency to a second case, meaning that the first case precedes the second case, then the second case is a tributary to the first case.

As used herein, the term "work stream" is a sub-process of a business process. For example, in one ERP system, Inventory Management (IM) is a sub-process of the business process Requisition to Check (RTC) that identifies the need for purchased materials and services, then sources, receives and deploys those materials in the most efficient manner possible and pays the suppliers. Workstreams within RTC may include, for example, Procurement, Inventory Management, and Accounts Payable.

Within the context of SAP systems, particularly as developed within the scope of the present invention, a number of additional acronyms and terms may be employed, as follows:

BCD (Business Configuration Design)—Design specification document used to capture unique configuration specific to a business process. When standard configuration is changed or customized, a BCD entry is required. This ensures a design blueprint for standard SAP transactions are maintained.

BPD (Business Process Design)—Document intended to capture the user requirements of the business process. This document includes high level functionality needs, business process comments, best practices, and overall conclusion of the intended use of the system.

BPF (Business Process Flow)—An illustration or flow of the business process described in the BPD.

BPP (Business Process Procedure)—Is a functional specification for requirements of a transaction in SAP or other complex software systems. Identifies functionality of transaction used and includes a step by step flow of the transaction, definition of each field, whether or not it is required, optional, etc., and general comments.

Business Process—A business process is an end to end logical grouping of sub-processes organized by functional business area (called Business Process Team).

CSV (Computer Systems Validation)—Confirmation by examination and provision of objective evidence that computer system specifications conform to user needs and intended uses, and that all requirements can be consistently fulfilled.

Electronic Signature—A computer data compilation of any symbol or series of symbols executed, adopted, or authorized by an individual to be an authorized equivalent of the individual's handwritten signature.

FRICE (Forms Reports Interfaces Conversions Enhancements)—Consists of a set of documents that capture both the functional and design specifications of a custom enhancement (i.e., a module developed in-house) to a complex software system such as SAP.

Traceability Matrix Report (as required by the CSV Fact Book)—A matrix that records the relationship between two or more products; e.g., a matrix that records the relationship between the requirements and the design of a given software component.

Validation Fact Book—A compilation of records retained from the Software Development Life Cycle that demonstrates the application meets its intended use.

BRIEF DESCRIPTION OF THE DRAWINGS

The present invention will be more fully understood and further advantages will become apparent when reference is made to the following detailed description of the invention and the accompanying drawings wherein like numerals represent like elements. The drawings are merely representative and are not intended to limit the scope of the appended claims.

FIG. 3 representatively illustrates a screenshot of an exemplary Test Case Catalog Maintenance Form;

FIG. 5 representatively illustrates a screenshot of an exemplary Case Characteristics Maintenance Form;

DETAILED DESCRIPTION OF THE INVENTION

Figure 1A:
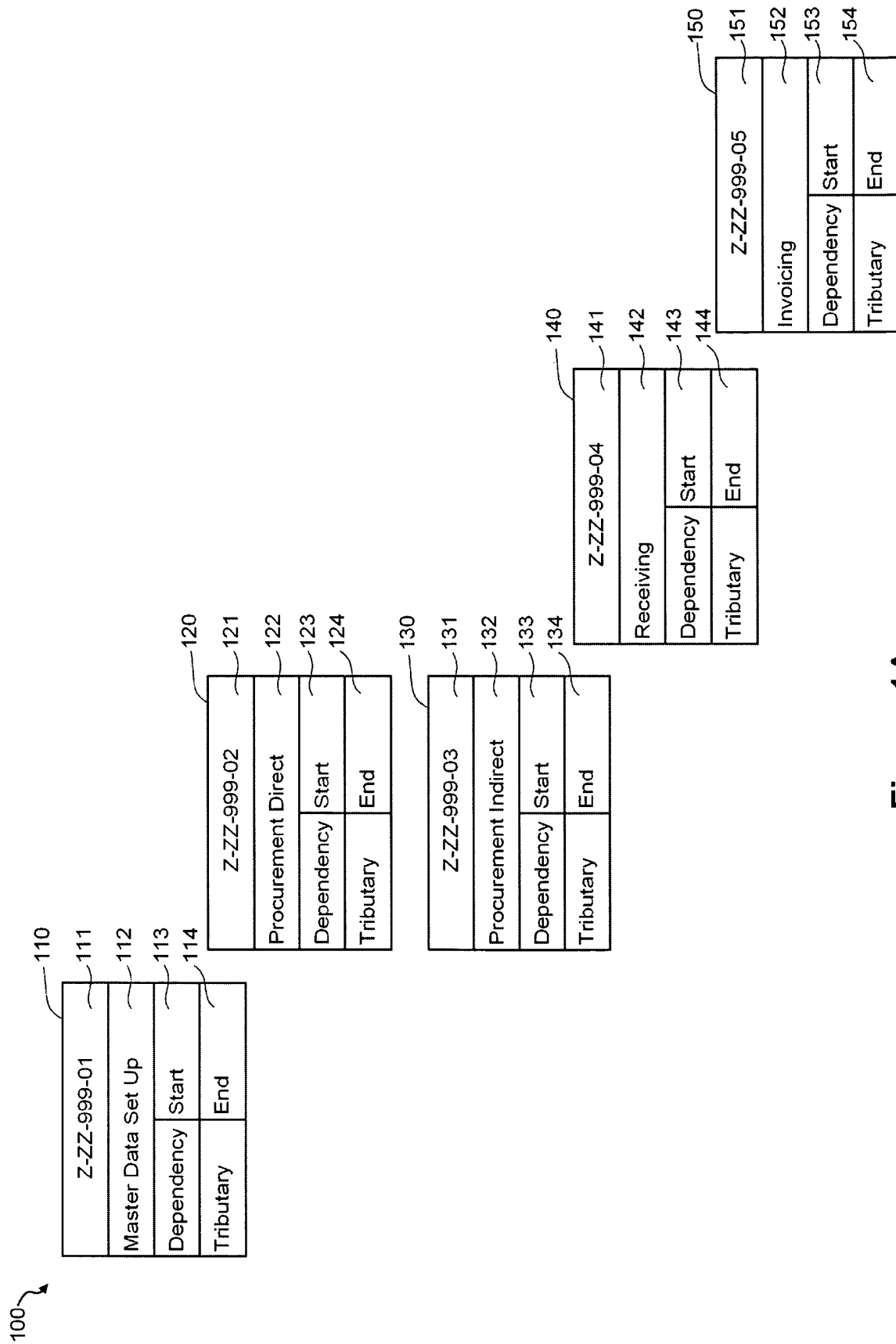
FIGS. 1A-1C representatively illustrate records of an Automated Multidimensional Traceability Matrix of the present invention.

The present disclosure of the invention will be expressed in terms of its various components, elements, constructions, configurations, arrangements and other features that may also be individually or collectively be referenced by the term, "embodiment(s)" of the invention, or other similar terms. It is contemplated that the various forms of the disclosed invention may incorporate one or more of its various features and embodiments, and that such features and embodiments may be employed in any desired, operative combination thereof.

It should also be noted that, when employed in the present disclosure, the terms "comprises", "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

The present invention is directed to solving problems related to how to choose an efficient assortment of test cases for testing a complex software system after it has been modified.

Additionally, the present invention solves the problem of automatically keeping track of relationships between various components of a complex software system such as modules, test cases, supporting documentation, business documents, documentation about the project and testers and testing schedules. Further, the present invention solves the problem of providing improved computer tools and automation tools for overseeing and guiding improvements to the development of or improvement of complex software systems.

The automated tool of the present invention is normally used in conjunction with a suite of test cases that are designed to test the operation of components of the complex software system to ensure that predetermined operations yield expected results and that components related to a modified component have been properly reviewed or modified in response. The testing of the complex software system is typically done by running predetermined test cases with known expected outcomes that can be compared with the actual output of the complex software system. A test case comprises one or more transactions involving one or more software modules, and may involve a series of transactions executed in a predetermined order specified in a test case script to simulate actual uses of the complex software system. Each transaction executed may be represented by individual test cases that can be strung together to represent more complex sequences of actions within a larger test case (a parent case). For example, a test case aimed at testing a purchasing system might include the following steps as transactions:

- creation of a new record for a new vendor in a vendor database,
- creation of a new record for a standard product provided by the new vendor,
- generation of a purchase request for the product of the new vendor,
- generation of tax information pertaining to the purchase of the product, and
- issuance of a purchase order to the new vendor.

Some of these steps may invoke additional operations or require input from additional sources. Any or all of the above steps may be designed to occur automatically in response to an initial request, in which case the expected results of the automatically executed steps could be expected output for the test case, to which the actual results of the test case would be compared.

In a complex software system comprising a plurality of integrated software modules and typically a plurality of interfaces to allow software modules from two or more sources to work together, the testing of the software after one or more modules has been changed may require execution of numerous test cases (e.g., several thousand). Each test case runs one or more software modules to test a particular functionality. The script of the test case is a document that defines what transactions are executed, what input is required, and what results are expected to be generated. The actual results can then be compared with the expected results to ensure that the tested portions of the complex software system are operating properly. When a software module is modified or developed, the tools of the present invention allow a list to be generated showing what other test cases may have been affected by the modification, thus indicating which additional test cases may need to be rerun.

At the core of the automated tool is the concept of a Automated Multidimensional Traceability Matrix that describes the relationships between all components of interest in the complex software system. The Automated Multidimensional Traceability Matrix is a computer-based representation of the linkages between software components and optionally other components of the complex software system. In one embodiment, the relationship information in the Automated Multidimensional Traceability Matrix is derived exclusively or predominantly from dependency and tributary information entered for test cases. In a related embodiment, the Traceability Matrix may also contain information about the individual software components accessed in-the transactions executed in running the test cases, such that the Traceability Matrix can be used to determine the relationship between test cases or between software modules and test cases. In another embodiment, the Automated Multidimensional Traceability Matrix comprises information about the relationships between test cases as well as between individual components of the complex software system, such that the Traceability Matrix may be used to determine the relationship between software modules and test cases, or between test cases, or between the individual software modules.

In one embodiment, the Automated Multidimensional Traceability Matrix provides a single source for managing test cases (and related documentation) in an electronic catalog, and also serves as an analytical tool to show interrelationship of test case dependencies. Further, the Automated Multidimensional Traceability Matrix may be used to allow multiple users to understand the complex software system from a common perspective that aids in impact analysis and production support.

In other embodiments, the Automated Multidimensional Traceability Matrix may also be used to achieve any or all of the following additional objectives:

- Provide a tool for work streams to manage and plan test case execution at a detailed level; while supporting a cross-work stream project work plan.
- Provide a consistent tool for measuring test cycle progress across all work streams.
- Maintain reusable testing information.
- Make supporting business and technical documentation easily accessible.

Capture CSV relevant information to satisfy required Validation Fact Book reporting (e.g., be used to support a Traceability Matrix Report to satisfy the Validation Fact Book requirement).

Support the change management process through providing related business requirement documents that may need review or change.

Tests cases can be organized using a Test Case Catalog, which provides information that defines at least a portion of the Traceability Matrix. When the Traceability Matrix is intended to define relationships between test cases only, then the relationship information in the Test Case Catalog essentially defines the Traceability Matrix, but additional relationship information can be included as well (e.g., relationships pertaining to individual components). A Test Case Catalog List is provided in a graphical user interface which displays all test cases or a selected subset of the test cases. Test cases may be displayed as a list, a cluster, a series of named icons or other formats. When a list is displayed, the list may be displayed according to alphabetical order of the test case name or a test case descriptor, or the listing may be ordered according to other fields pertaining to the test case, such as date of modification, associated project, department, identity of owner or last person to modify the test case, and the like. The display of the Test Case Catalog List can be on a Web page or other electronic format, including a display from a word processor or spreadsheet. The Test Case Catalog List preferably provides rapid linking to or display of the detailed information associated with any selected case. For example, single clicking on the name of a test case or other display associated with a test case in the Test Case Catalog List may cause detailed information for the selected test case to be displayed in a new window or in the same window that previously held the Test Case Catalog List. In one embodiment, the detailed information for the test case is inserted into the existing display of the Test Case Catalog List.

The Automated Multidimensional Traceability Matrix is the combined information about relationships between various components of the complex software system such as test cases and software components or transactions, and optionally the status of associated components such as documentation. The Automated Multidimensional Traceability Matrix is a tool on computer-readable media that describes the relationships of components in a way that can be automatically accessed in order to, for example, determine what test cases must be run in response to a change in one or more components of the complex software system to ensure that the system is operating properly. The combined relationship information that defines the Automated Multidimensional Traceability Matrix particularly includes the tributary and dependency information for each test case or software module, which can be entered for each of the test cases using Test Case Catalog Maintenance Forms, hereafter described. The Automated Multidimensional Traceability Matrix can be stored as a database of relationships between test cases and other components of the complex software system or can contain such information in any other electronic form, provided that tributaries and dependencies for each software module or other component of interest are defined in a way to support automatic listing of affected components for a change in one or more of the modules.

Information regarding test cases may be entered in a Test Case Catalog Maintenance Form, which can be a Web-based form or other electronic document to receive information about test cases and then use this information to update the Automated Multidimensional Traceability Matrix, as needed. The Test Case Maintenance Form provides a means to receive and display information about any single test case. In one embodiment, the Test Case Catalog Maintenance Form can comprise fields such as:

Test case descriptors (title, ID number, short description, objectives, comments, level of complexity indicators, etc.)

Transactions for the test case—a description of the series of events that are invoked when the test case is run Tributary list—list of test cases that succeed the given test case Dependencies list—list of test cases that precede the given test case Test case deliverables—list of business requirements documents that support the test case execution As a simple illustration of how tributaries and dependencies are tracked, a subset of five test cases from a hypothetical ERP system will be examined in the context of entering dependency and tributary test case data in the Automated Multidimensional Traceability Matrix.

FIG. 1A is a graphical representation of the records 100 of an Automated Multidimensional Traceability Matrix providing information pertaining to a set of test cases (110, 120, 130, 140, and 150, respectively) with test case identities Z-ZZ-999-01 through Z-ZZ-999-05 in identity fields 111, 121, 131, 141, and 151, respectively. The test cases refer to various transactions, namely: (1) Master Data Set Up 112, (2) Procurement Direct 122, (3) Procurement Indirect 132, (4) Receiving 142, and (5) Invoicing 152, which together could represent a business process. Each test case has a specific purpose, but in order to properly test them an order of execution needs to be established. As displayed in FIG. 1A, the test cases initially are isolated, with no dependencies or tributaries in the dependency fields (113, 123, 133, 143, and 153), or the tributary fields (114, 124, 134, 144, and 154), respectively—in other words, there are five individual test cases with no sequence established between them. Each test case is displayed in a box showing the case identity (111, 121, 131, 141, and 151, respectively), the title (112, 122, 132, 142, and 152), a dependency field (113, 123, 133, 143, and 153), which can be simply "start" or the equivalent if it does not depend from any other test case, and a tributary field (114, 124, 134, 144, and 154), which can be simply "end" or the equivalent if no other cases are tributaries to it. This is how each record may appear in the Automated Multidimensional Traceability Matrix before any dependencies or tributaries are established. All test case sequences must have a defined start and end, and since the test case sequence is for an ERP, theoretically all test cases may be expected to be related in one sequence.

In practice, the relationships shown between any tributaries and the corresponding dependencies could be established by entering data in fields associated with tributaries, or with dependencies, or a combination of both. For example, the relationship between Master Data Set Up 110 (case Z-ZZ-999-01) and its two successor cases, case Z-ZZ-999-02 (120) and case Z-ZZ-999-03 (130), could have been established by noting that both Procurement Direct (case Z-ZZ-999-02) (120) and Procurement Indirect (case Z-ZZ-999-03) (130) must follow Master Data Set Up (case Z-ZZ-999-01) (110), and then entering "Z-ZZ-999-01" (or a code pointing to that case) in the dependency fields of records 123, 133 for the successor cases, case Z-ZZ-999-02 (120) and case Z-ZZ-999-03 (130)). Alternatively, an operator considering Master Data Set Up 110 (case Z-ZZ-999-01) could have noted that either Direct Procurement 120 or Indirect Procurement 130 could follow, depending on what is called for by the data associated with Master Data Set Up. Thus, the operator could then have made an entry into the tributary field 114 of Master Data Set Up, entering information to indicate that Master Data Set Up has as tributaries both test case Z-ZZ-999-02 and case Z-ZZ-999-03. The dependency fields of the latter two test cases would then automatically be updated, showing that they are both dependent on case Z-ZZ-999-01.

Figure 1B:
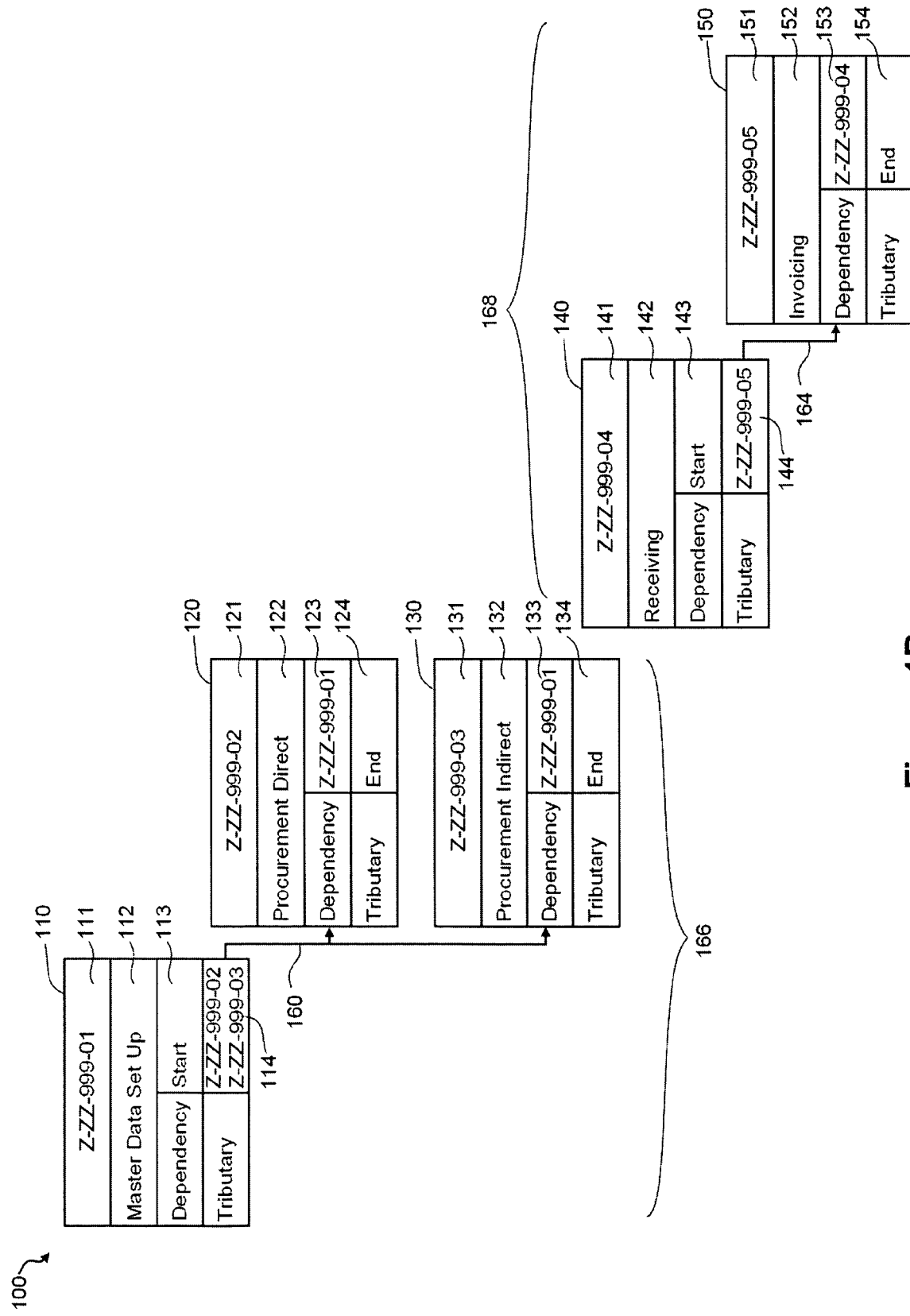

FIG. 1B shows how the records 100 of the Automated Multidimensional Traceability Matrix from FIG. 1A are changed in response to input indicating that the test case for Master Data Set Up 110 (Z-ZZ-999-01) must precede Procurement Direct 120 (Z-ZZ-999-02) and Procurement Indirect 130 (Z-ZZ-999-02) (see the Work Stream definition above), and in response to entered data indicating that the test case for Invoicing 150 (Z-ZZ-999-05) is to be executed after Receiving 140 (Z-ZZ-999-04). Lines and arrows are drawn in a manner typical of flow charting techniques to visually indicate the relationships that are established by records in the dependency fields (113, 123, 133, 143, and 153) and tributary fields (114, 124, 134, 144, and 154) of the records 100 of the Automated Multidimensional Traceability Matrix. Thus, the addition of two dependencies from test case Z-ZZ-999-01 (110) is indicated by the addition of lines 160 joining cases Z-ZZ-999-02(12) and Z-ZZ-999-03 (130) to case Z-ZZ-999-01 (110), with arrows pointing to the dependencies. The dependency fields 123, 133 for both Z-ZZ-999-02 (120) and Z-ZZ-999-03 (130) now list case Z-ZZ-999-01 (110) as the case from which they are dependent. The tributary field 114 for case Z-ZZ-999-01 (110) now shows that this case has cases Z-ZZ-999-02 (120) and Z-ZZ-999-03 (130) as tributaries. FIG. 1B also shows a line 164 expressing the new relationship between case Z-ZZ-999-04 (140) and case Z-ZZ-999-05 (150), in which the latter is a tributary relative to the former. The tributary field 144 for case Z-ZZ-999-04 (140) now lists case Z-ZZ-999-05 (150), and the dependency field 153 for case Z-ZZ-999-05 (150) lists case Z-ZZ-999-04 (140). At this stage of data input into the records 100 of the Automated Multidimensional Traceability Matrix, there are two separate strings of test cases 166, 168.

The traceability matrix software of the present invention maintains integrity between dependencies and tributaries by always building the inverse relationship. Thus, for every entry in either a dependency or tributary, a second relationship is built that mirrors the original entry. Entering a first test case number into a dependency field of a second test case results in automatic entry of the second test case number into the tributary field of the first test case This features provides internal consistency in the tributary and dependency data, ensuring that integrity can be maintained in the interrelated test case data of the Automated Multidimensional Traceability Matrix.

Figure 1C:

FIG. 1C illustrates completion of the chain of integrity from the first test case 110 (Z-ZZ-999-01) to the last 150 (Z-ZZ-999-05), differing from FIG. 1B by the establishment of relationships indicates as a line 162 between test case Z-ZZ-999-04 (140) as being a tributary to test cases Z-ZZ-999-02 (120) and Z-ZZ-999-03 (130), which now list test case Z-ZZ-999-04 (140) in their tributary fields 124, 134, respectively.

The Automated Multidimensional Traceability Matrix software tool generally comprises multiple associated components. One component can be the Test Case Catalog, which provides a graphical user interface to view information about the test cases. A Test Case Planning tool can also be incorporated into the Automated Multidimensional Traceability Matrix software tool. CSV Management offering transaction/program traceability is another feature that can be directly incorporated into the Automated Multidimensional Traceability Matrix software tool. An Analysis Road Map (hereafter described) for providing a visual display of the relationships between test cases is another element that can be incorporated into the Automated Multidimensional Traceability Matrix software tool. These components are described in more detail below, in which screen shots from an embodiment of the present invention are described in the context of a customized tool for testing of a complex software system comprising SAP R/3, although it must be understood that a similar tool could be adapted for numerous complex software systems. The customized tool will be referred to as the POLARIS tool, standing for "Process Optimization Leveraging All Resources and Integrated Systems."

Figure 2:
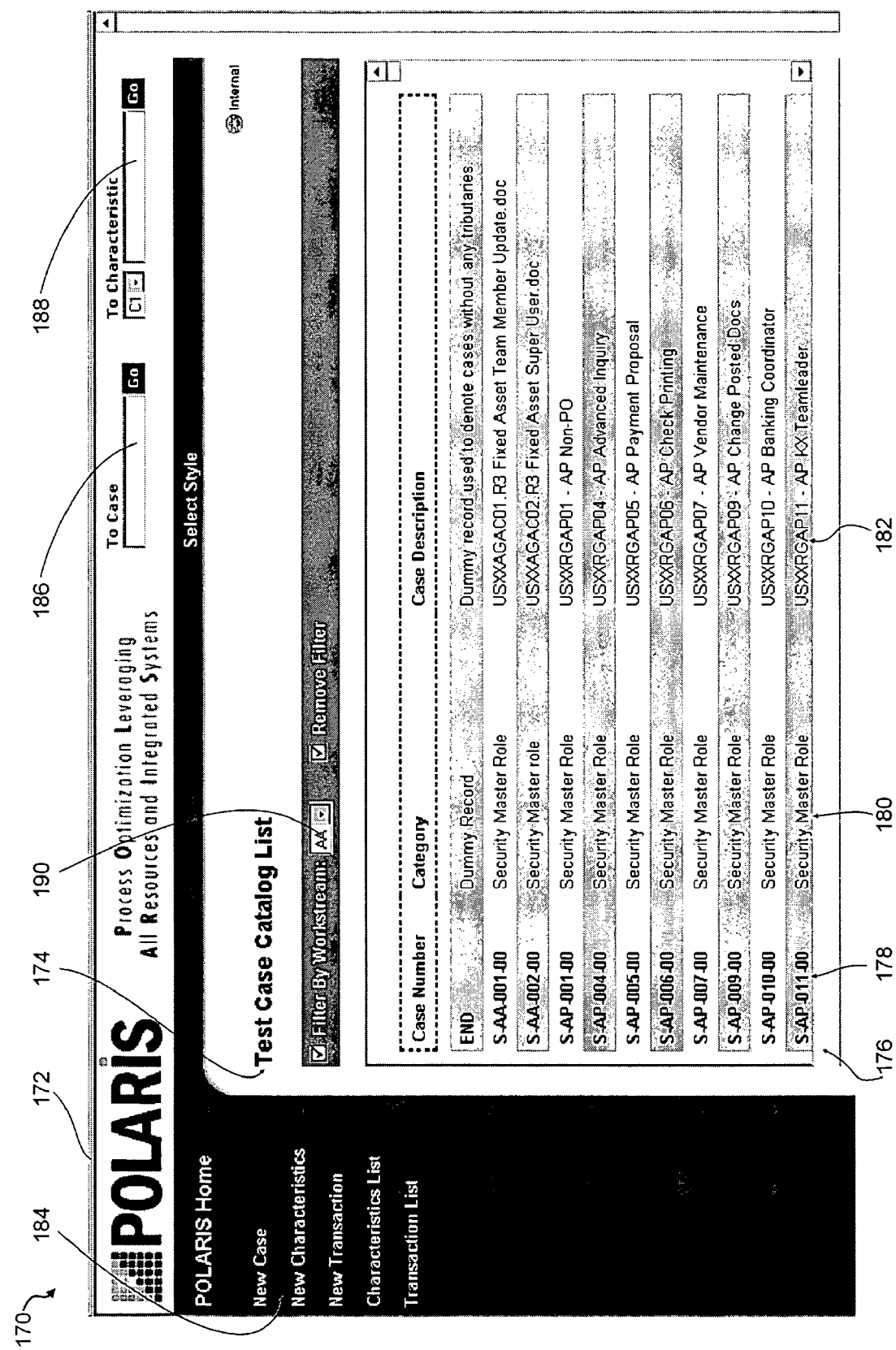
FIG. 2 representatively illustrates a screenshot of an exemplary Test Case Catalog List.

FIG. 2 is a screenshot 170 of an Intranet page for one embodiment (POLARIS) of the automated tool showing an interactive page 172 featuring the Test Case Catalog List 174, which is a comprehensive list of all test cases 176 that address the functions that need to be tested in order to ensure quality. Cases may be listed by case number 178, as shown. A category field 180 is also displayed, as is a case description 182, in the depicted embodiment. Links 184 at the left of the screen provide access to features that generate new cases or that can add new characteristics or transactions to existing cases, or provide a list of transactions available. Text boxes provide rapid access to specific cases or characteristics.

Subsets 186 and 188 of the test cases can be displayed, as desired. For example, a dropdown box 190 allows the operator to filter the displayed cases according to the work stream associated with the test cases. The filter can be removed to allow all cases to be displayed again.

The test cases are typically defined and created during the development phase of the project, and should reflect the functionality as defined by design. Generally, test cases would be removed from the catalog only when that functionality has been eliminated by the business.

Figure 3:
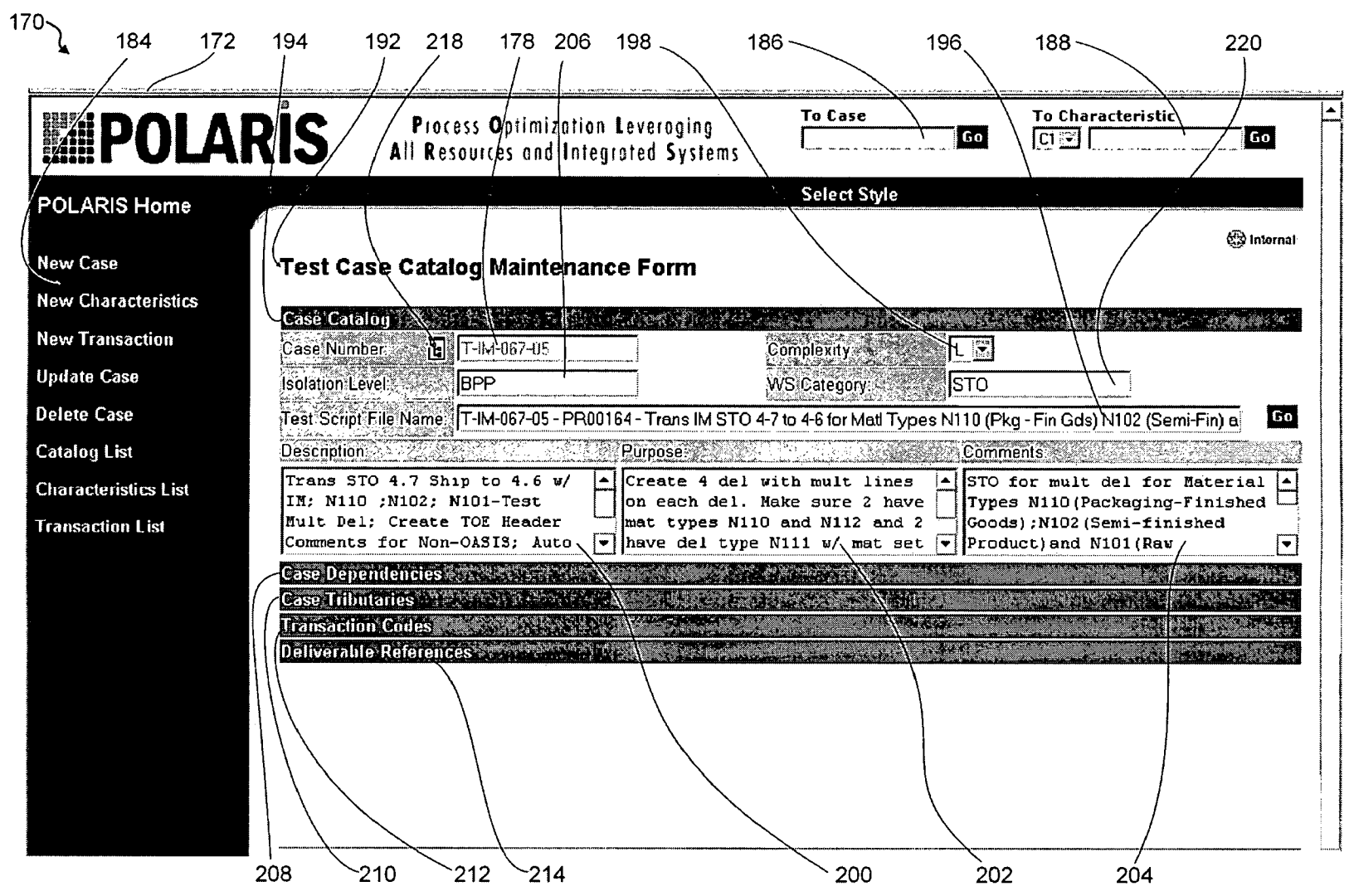

FIG. 3 depicts a screenshot 170 of the Test Case Catalog Maintenance Form 192 in the POLARIS tool. Catalog fields for the test case are defined in the table area labeled "Case Catalog" 194 including fields for case number 178, file name for the test script 196, complexity 198 (levels indicating how complex the case is), description of the case 200, purpose of the case 202, comments 204, etc. The Isolation Level field 206 provides information about what aspects of the complex software system can be accessed during execution of the test case. For example, values entered can indicate that all SAP transactions are available, or that customized Corporate functions are available, or that no restrictions are imposed.

The information on case dependencies and tributaries are provided in tables (presently hidden) that appear when the operator clicks on "Case Dependencies" 208 or "Case Tributaries" 210, respectively. Tables with transaction codes 212 and deliverable references 214 are also provided, though presently not displayed. The deliverable references 214 can contain information about what business processes the test case is connected to. For example, fields can contain uniquely assigned deliverable codes that identifies either a BPP, BPD, BPF, or BCD, as previously defined.

The test case complexity field 198 in the example shown can have values selected from H (High), M (Medium), and L (Low), based upon the following definitions:

(H)igh=Difficulty is considered high due to complex business process, complex customized program (e.g., a FRICE), series of transactions required to perform is 5 or greater, or number of test data variants required to properly test is greater than 10

(M)edium=Difficulty is considered average or process is well-known, <5 transactions to execute, <10 test variations in data to adequately test (L)ow=Process is straight-forward and well-known, 1 to 2 transactions to execute, 3 or less test variations will properly test The Test Case Catalog Maintenance Form 192 may be adapted, as in the present case, to provide any information needed about a test case. There is a "GO" button next to the test script file name field to open the actual test case script for details on how to execute the script or for other information pertaining to the script. Fields under the Deliverable References area 214 (not shown) have "GO" buttons to display the business requirements document that supports this test case, and there are "GO" buttons beside each transaction in the transaction codes area (not shown) that will take one-to detailed information around the transaction/program. (Alternatively, unique icons or identifiers can be used instead of a single style of "GO" button to uniquely identify the action that will occur when the button associated with a field is clicked.)

The flowchart icon 218 next to the test case numbers 178 can be clicked to generate an Analysis Roadmap of related test cases, discussed hereafter.

Figure 4:
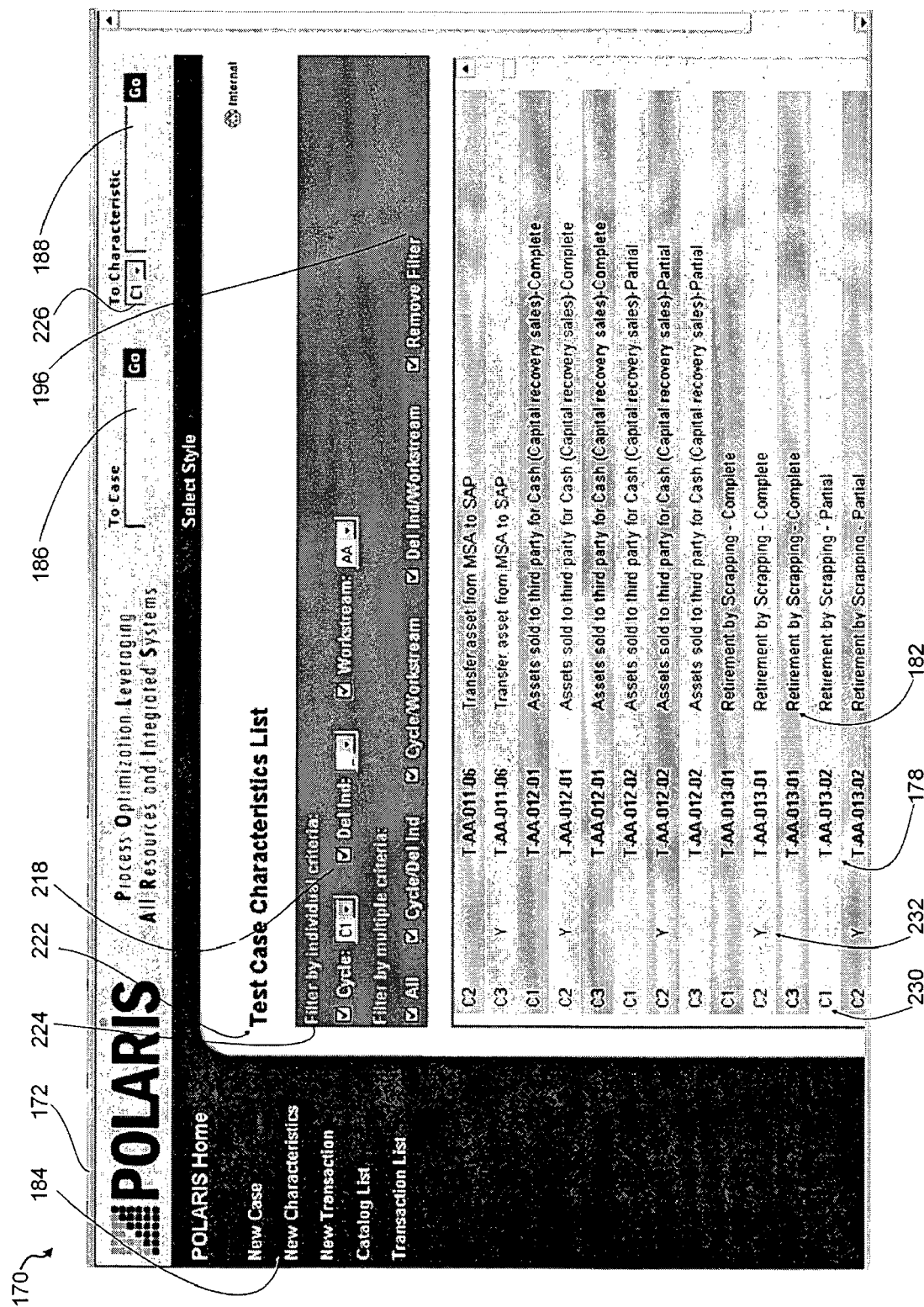
FIG. 4 representatively illustrates a screenshot of an exemplary Test Case Characteristics List.

FIG. 4 is a screenshot 170 of the Test Case Characteristics List 222. This portion of the Automated Multidimensional Traceability Matrix software tool can help support planning of test cases 178. There are frequently two main objectives in test case planning that can be supported by this tool:

1. To provide detailed test case level tasks for the work streams to manage resource and time against when organizing a test plan for development or enhancement.

Queries can be built to assist in resource leveling and report work assignments and progress.

2. To provide test case level detail of work completed for status.

The Test Case Characteristics List 222 provides a complete list of all test cycles, which are assigned cycle numbers 230 for current scope of testing, and test cases 178 that are available. Specific cycles once completed will be archived or deleted at the direction of the tool administrator. Cycles refer to specific iterations or groups of test cases to be executed for various purposes (e.g., to implement a new version of AP, to test results of a new project, to handle updates in other software or hardware systems, etc.) Cycles of testing for various objectives may correspond to a scheduled period of time and can also refer to a particular test environment or group of testers. Also displayed are descriptions 182 of the test cases 178. A logical delete indicator 232 provides an option (when set to "Y") to remove a test case from the cycle without physical deletion of the test case. This can be desirable, for example, when a test case has become obsolete or should not be used for other reasons.

A filtering region 224 provides filtering options available to isolate a specific cycle, work stream, and logically deleted test cases. The appropriate check box needs to be clicked depending on the combination of selection criteria used.

Again the test case number 178 acts as a jump function to go into the specific details of that characteristic. Also, if the specific cycle and case are known and entered in the appropriate regions 226, 188, direct access to the test case characteristic is possible.

Figure 5:
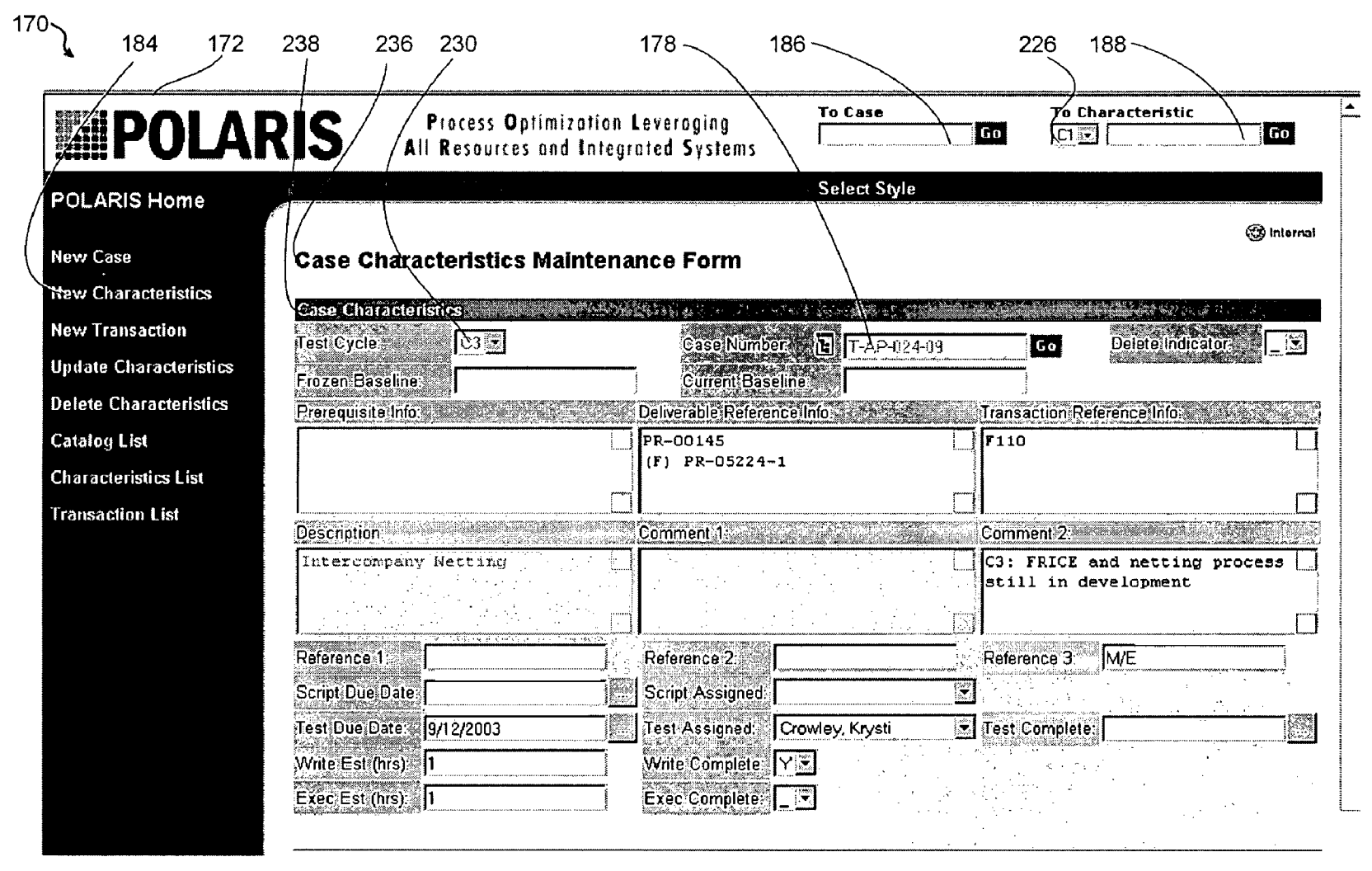

FIG. 5 shows a screenshot 170 of the Case Characteristics Maintenance Form 236 providing information on test case characteristics 238. The fields on this screen are used to plan the detailed construction and execution of test cases 178 and make assignments and estimates. The administrator may use the completion indicators to measure progress of the overall project.

The "GO" button next to the test case name will jump directly to the test catalog information. The analyze icon to the left of the test case number field produces the Analysis Roadmap (hereafter described).

The '. . . ' button next to the date fields that will, when left-button clicked, show a pop-up calendar for the selection dates.

All information on the Test Case Characteristics screen 172 is modifiable by the work streams; with the exception of the baseline values of the project schedule (information pertaining to the scheduling of test activities). These fields are displayed but entry into these fields is blocked. The tool administrator maintains control over these fields.

Figure 6:
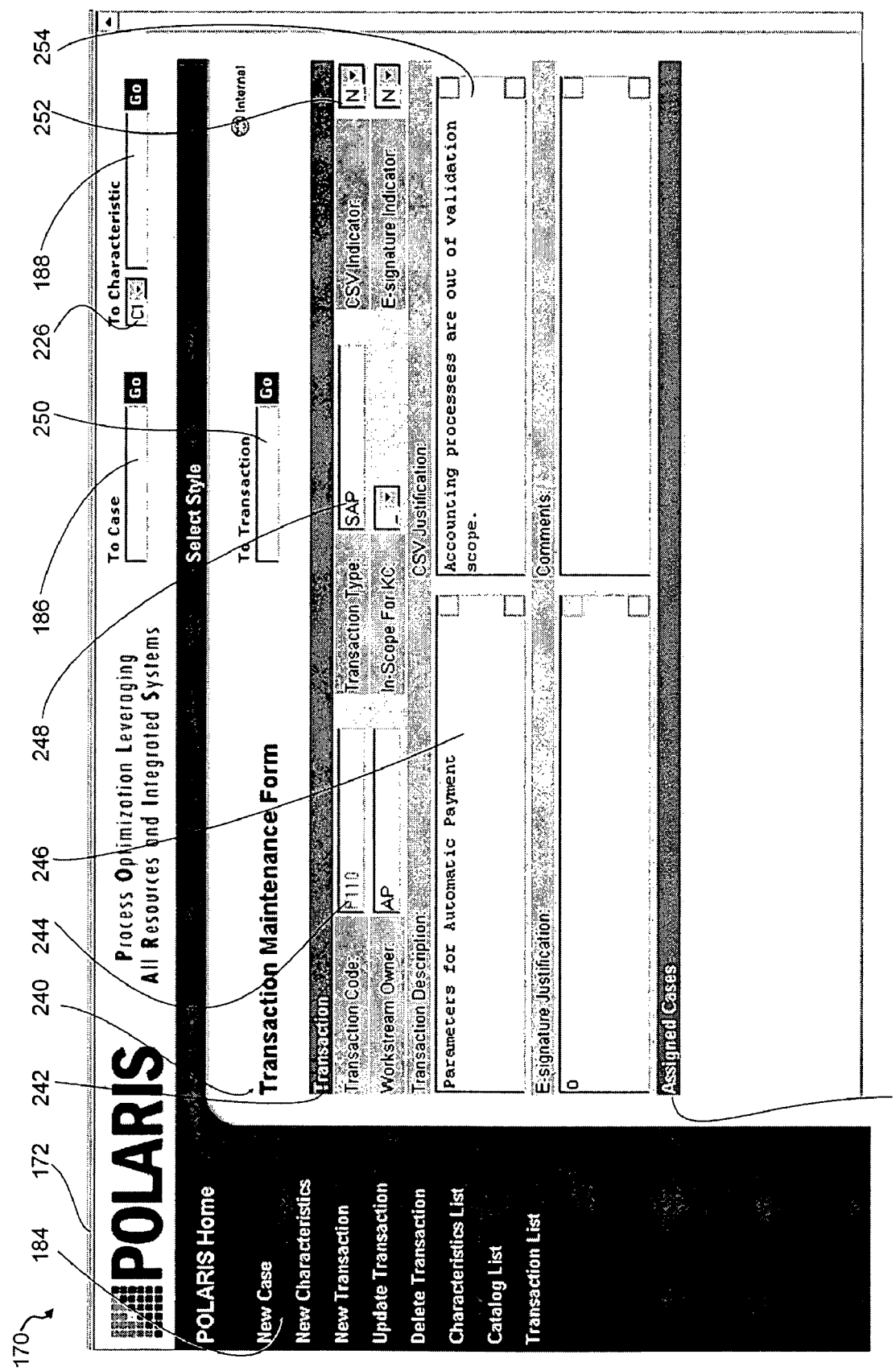
FIG. 6 representatively illustrates a screenshot of an exemplary Transaction Maintenance Form.

FIG. 6 shows a screenshot 170 of the Transaction Maintenance Form 240, which provides information about particular transactions 242 or software modules in the complex software system. Each transaction can be assigned a transaction code 244, a transaction type 248 (e.g., SAP, custom, etc.), an organizational owner, etc. A transaction jump field 250 allows the user to quickly navigate to other transactions by entering a transaction code. Transaction descriptions 246 and other information are also provided in the graphical user interface shown in the screenshot 172. A field for CSV justification 254 is also provided. CSV relevancy will be managed at the transaction/program level. As a transaction/program (vendor or custom developed) is used in a test case, the transaction will be captured in the Automated Multidimensional Traceability Matrix. At this point, the CSV and E-signature indicators of the Transaction Maintenance Form will generally be left blank. An administrator may make a ruling on every transaction or program as to relevancy and set the CSV indicator 252 appropriately and provide a reason for the decision.

Generally, an administrator will handle all updates to this screen, but the information can be available for display by all users of the Automated Multidimensional Traceability Matrix tool.

Figure 7:
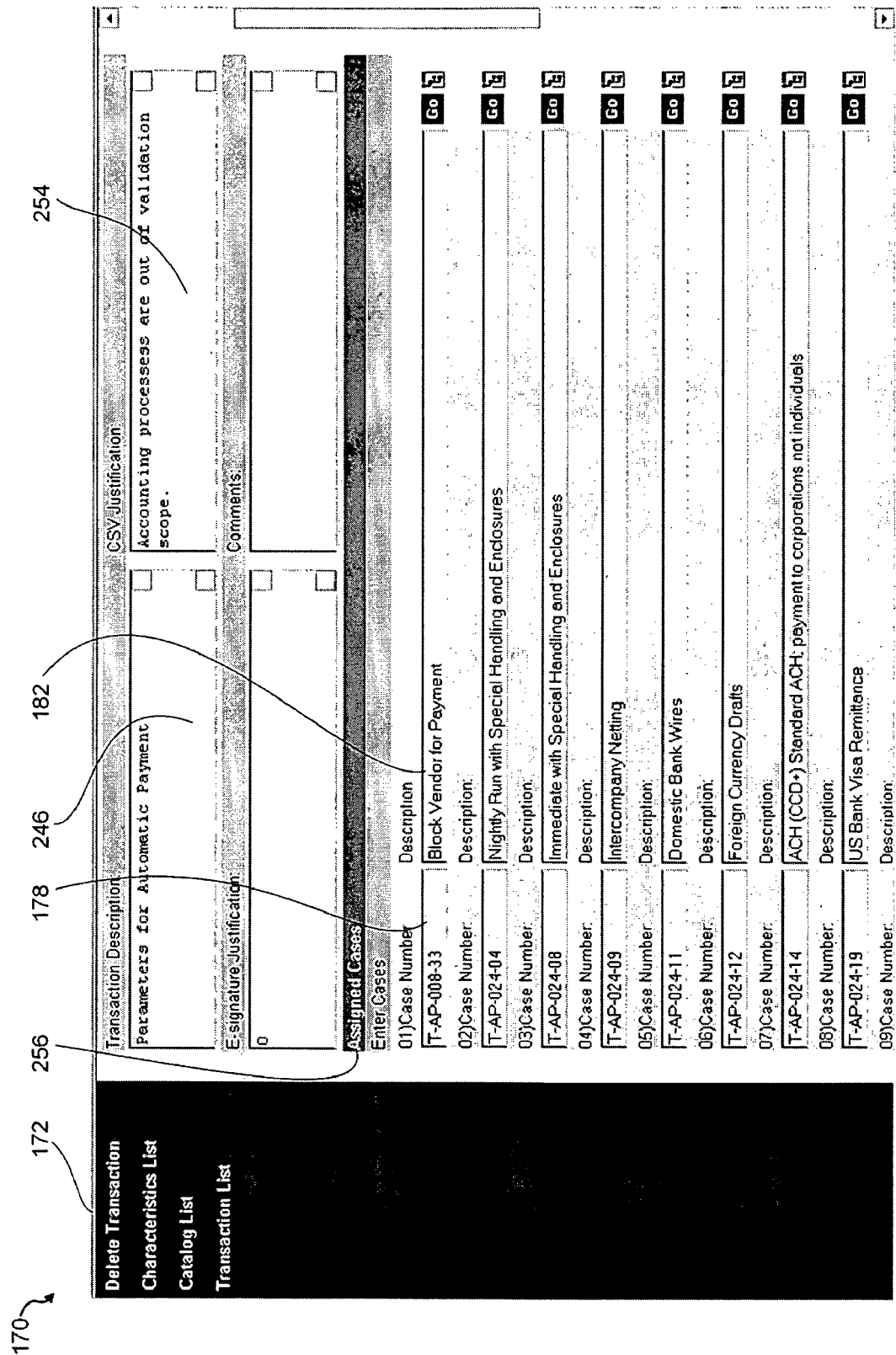
FIG. 7 representatively illustrates a screenshot of an exemplary view of "Assigned Cases" information that has been expanded or opened.

The drop down information for "Assigned Cases" 256 (not shown) can list all test cases that employ the transaction in question. This additional information is displayed in FIG. 7, depicting the lower portion of a screenshot after the "Assigned Cases" information 256 has been expanded or opened. Each "GO" button thereon jumps to that test case for the test case details. Each "Analysis" icon produces an Analysis Roadmap from that test case as a starting point.

Thus, the Automated Multidimensional Traceability Matrix provides a means of automatically determining all test cases 178 associated with a transaction or software module, and provides a means for accessing details of each test case from displayed information about the transaction. Tracing the relationships between software modules and test cases across multiple levels allows one to assess change impact (the scope of cases that may be affected by a change in a software module).

Figure 8:
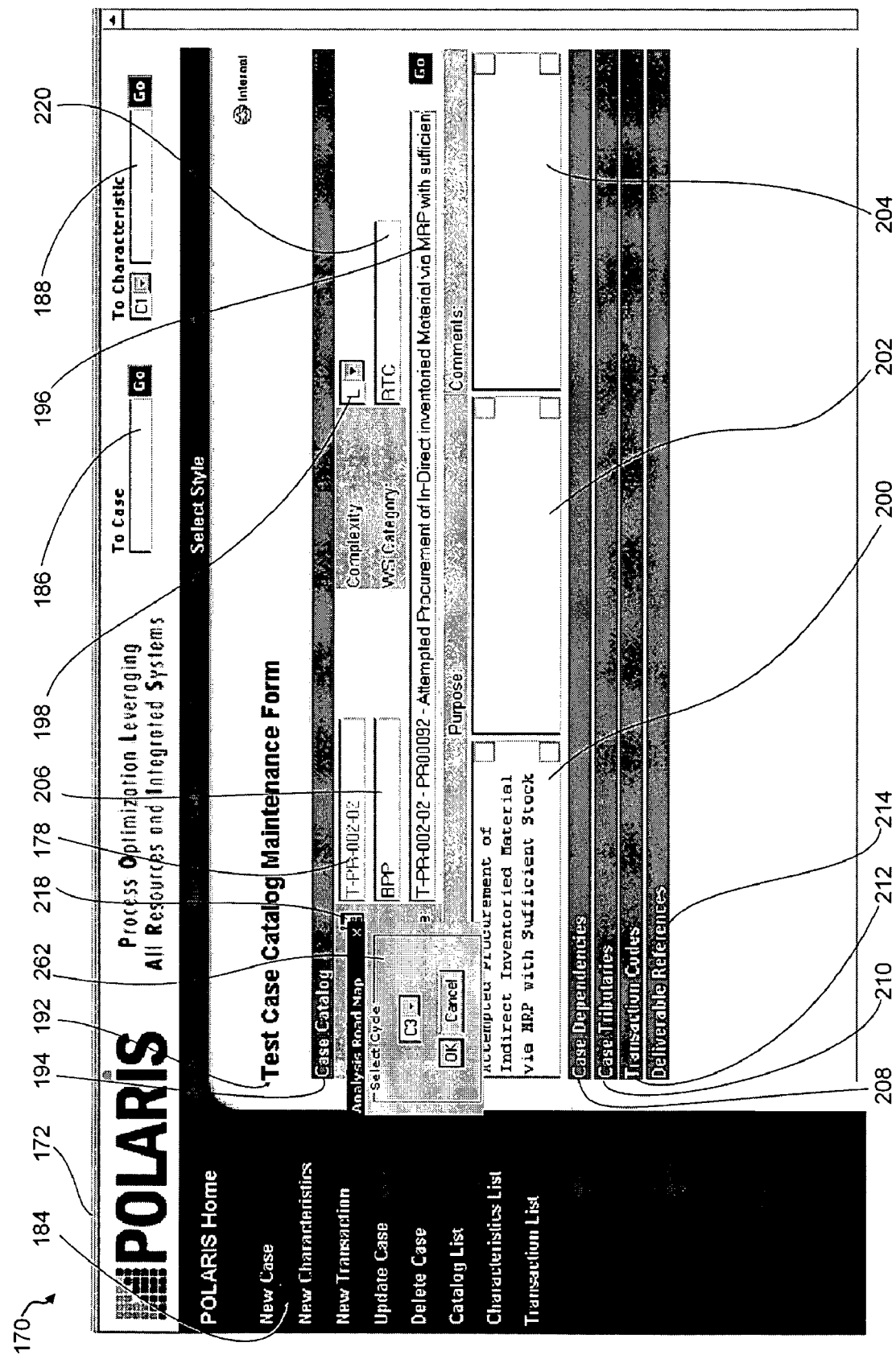
FIG. 8 representatively illustrates a screenshot associated with the screenshot of FIG. 3, depicting a dialog box that is displayed when an operator "clicks" on an analysis icon.

FIG. 8 is a screenshot 170 associated with the Test Case Catalog Maintenance Form 192 of FIG. 3, depicting a dialog box 262 that is displayed when the operator clicks on the analysis icon 218 to the left of the test case number 178 in FIG. 1. The dialog box prompts the operator to select a cycle. This selection overlays the schedule information developed by the work streams with the test cases. After selecting the cycle information, an Analysis Roadmap can be displayed, as shown in FIG. 9.

Figure 9:
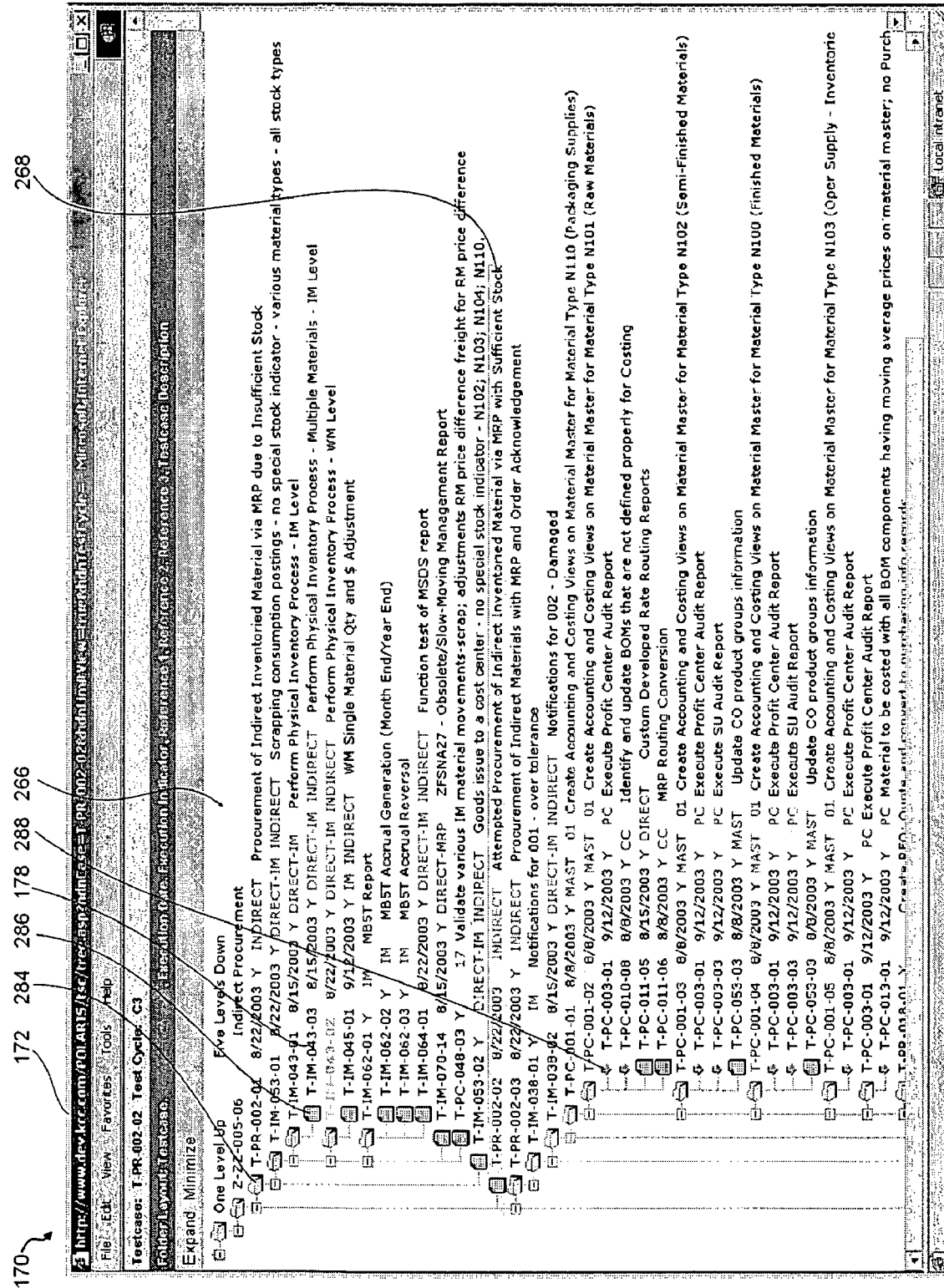
FIG. 9 representatively illustrates a screenshot of an exemplary Analysis Roadmap.

FIG. 9 shows a screenshot 170 of the Analysis Roadmap 266, of is a visual representation of the inter-relationships between test cases, with a highlighted text case 268 currently being selected. The intent is to take one-up and one-down relationships through the test case dependencies and tributaries and build a map of the process. Due to the number of test cases and inter-relationships in many complex software systems, a technique was used to subset the analysis roadmap in order to help comprehension. The technique used takes any given test case as a starting point, and reads 1 level up for dependencies, and down 5 levels through the tributaries. (Any other combinations of numbers for levels up and down could be used, if desired, such as any integer from 0 to 25 for levels up and any integer from 2 to 25 for levels down, for example) The use of one level up and five levels down creates a display that shows inter-relationships for 7 levels. If additional information is needed that precedes the one displayed, the highest level may be selected and re-analyzed to progress up the chain of test cases. If additional information is needed beyond the current roadmap, a test case down the chain may be selected that represents the area for further analysis.

In the graphical user interface associated with the on-screen display of the Analysis Roadmap 266, a test case can be selected and the upstream and downstream test cases associated with are automatically displayed. Other rules can be implemented for displaying related cases, such as showing two upstream levels and three, four, five, six, seven, or eight downstream levels.

In the Analysis Roadmap of FIG. 9, a folder representation technique is used due to its familiarity with many computer users, though many other graphical systems known in the art could be used (e.g., branch and tree diagrams, spoke and hub diagrams, linked bubble diagrams, etc.). The folder theme allows one to easily expand and collapse details by clicking on icons or lines of text, if desired. In one embodiment, a folder with a plus means there is detail to be expanded underneath by left-button clicking on the plus sign. Where detail has been presented and a minus sign accompanies a folder, the detail can be collapsed by left button clicking on the minus sign. This allows customization of the detail to view by each user.

A document icon 286 next to a test case indicates there are no tributary test cases below this one. In other words, this :is the end of that string. A downward arrow icon 288 next to a test case indicates there is more detail in the sequence of cases, but an analysis needs to be performed using this case as a starting point to see the test cases below it.

Highlighting of a line indicates the test case 268 where the analysis was started. In FIG. 9, test case T-PR-002-02 is highlighted 268. One level up is test case Z-ZZ-005-06, "Indirect Procurement." Other test cases within the parent test case, "Indirect Procurement," are shown, including test case T-PR-002-01, "Procurement of Indirect Inventoried Material via MRP due to Insufficient Stock," portrayed as a folder icon with several levels within it, and test case, T-PR-002-03, "Procurement of Indirect Materials with MRP and Order Acknowledgement," also within the parent test case. Dependencies within the latter are also shown in the screenshot of FIG. 9.

Each test case number 178 on the Analysis Roadmap acts as a jump function to the details and from there a re-analysis may be performed to achieve a different subset of information.

In general, information about the relationship between test cases in the Automated Multidimensional Traceability Matrix can be displayed graphically in an Analysis Roadmap 266. In one approach, the Analysis Roadmap displays test cases in much the same way that computer systems with graphical user interfaces display files within folders. In particular, the Analysis Roadmap may be analogous to the way in which Windows Explorer in the WINDOWS® operating system (e.g., WINDOWS® 2000 system or WINDOWS XP® system) displays files as elements of folders: This tool uses the dependency and tributary relationships to map out all relationships and lay them out in a logical folder diagram. In one embodiment of the Analysis Roadmap, a series of test cases are displayed in a vertical list, with one test case per line, and with an icon such as a representation of a folder or of a document on the line of the test case. The folder icon 284, for example, can be used to represent those cases with additional test cases within them, while the document icon 286 can represent a test case without additional cases within.

When the lowest level of any chain of test cases in the Automated Multidimensional Traceability Matrix is a test case that evaluates a single software module, then the relationship between such lowest-level test cases and other test cases (including those comprising many transactions) establishes the relationship between individual software modules and test cases and optionally other components, such as documentation. Alternatively, the lowest level test cases in some chains need not be those testing single software modules or transactions, but may be more complex. However, individual software modules or transactions can still be associated with such cases, thereby allowing relationships between the software modules or transactions and various test cases to be automatically determined. In general, the Automated Multidimensional Traceability Matrix may be used to establish the relationship between the test cases as well as between other components of the complex software system.

Figure 10:
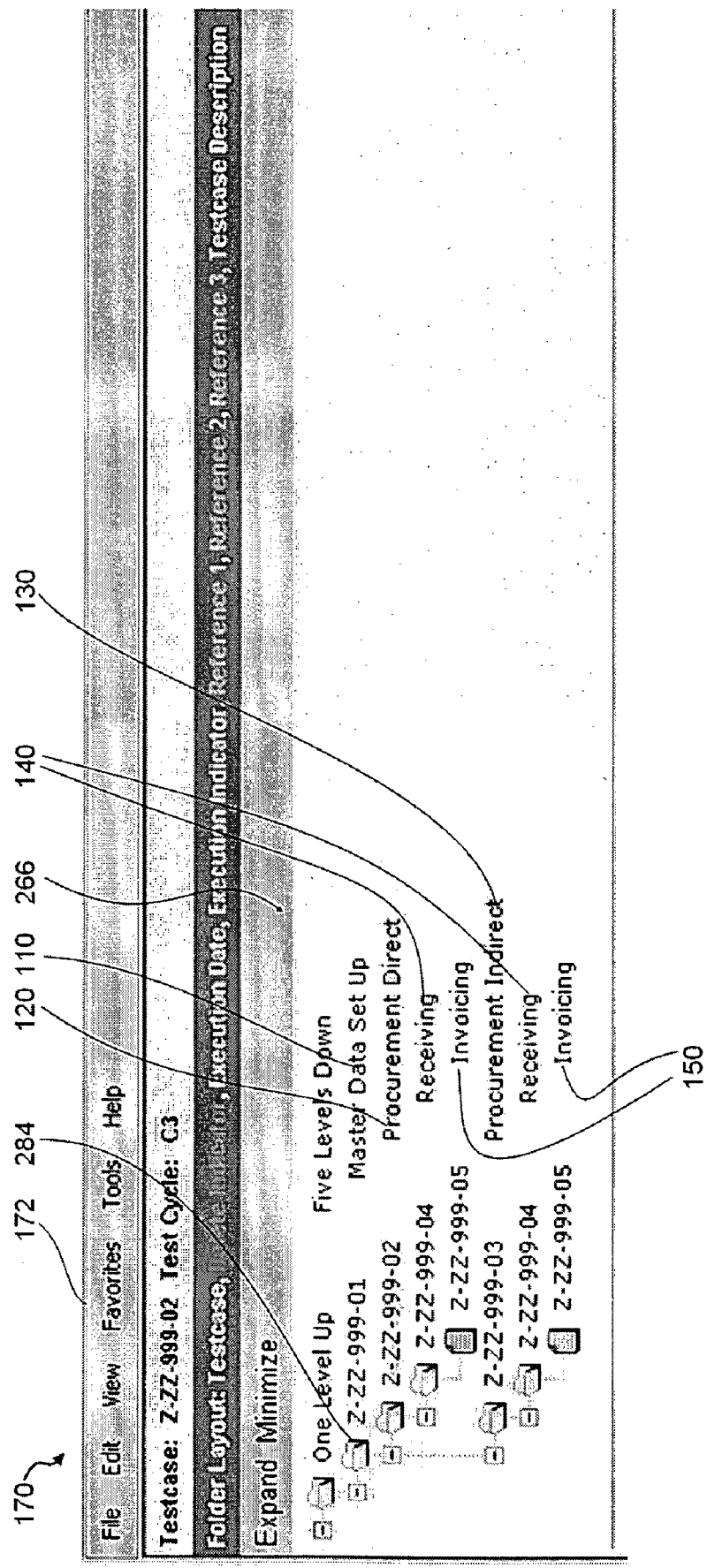
FIG. 10 representatively illustrates a screenshot of an Analysis Roadmap for the Automated Multidimensional Traceability Matrix information depicted in FIG. 1C.

FIG. 10 depicts a screenshot 170 displaying an Analysis Roadmap for the Automated Multidimensional Traceability Matrix information in FIG. 1C, with test case Z-ZZ-999-02 (120), "Procurement Direct," highlighted as the starting test case from which the Analysis Roadmap was prepared. Going one level up includes "Master Data Set Up" 110 (test case Z-ZZ-999-01). One the same level is "Procurement Direct" 120. Both "Procurement Indirect" 130 and "Procurement Direct" 120 are shown having two levels of dependencies. The dependencies for each level are the same two test cases, "Receiving" 140 and "Invoicing" 150.

Figure 11:
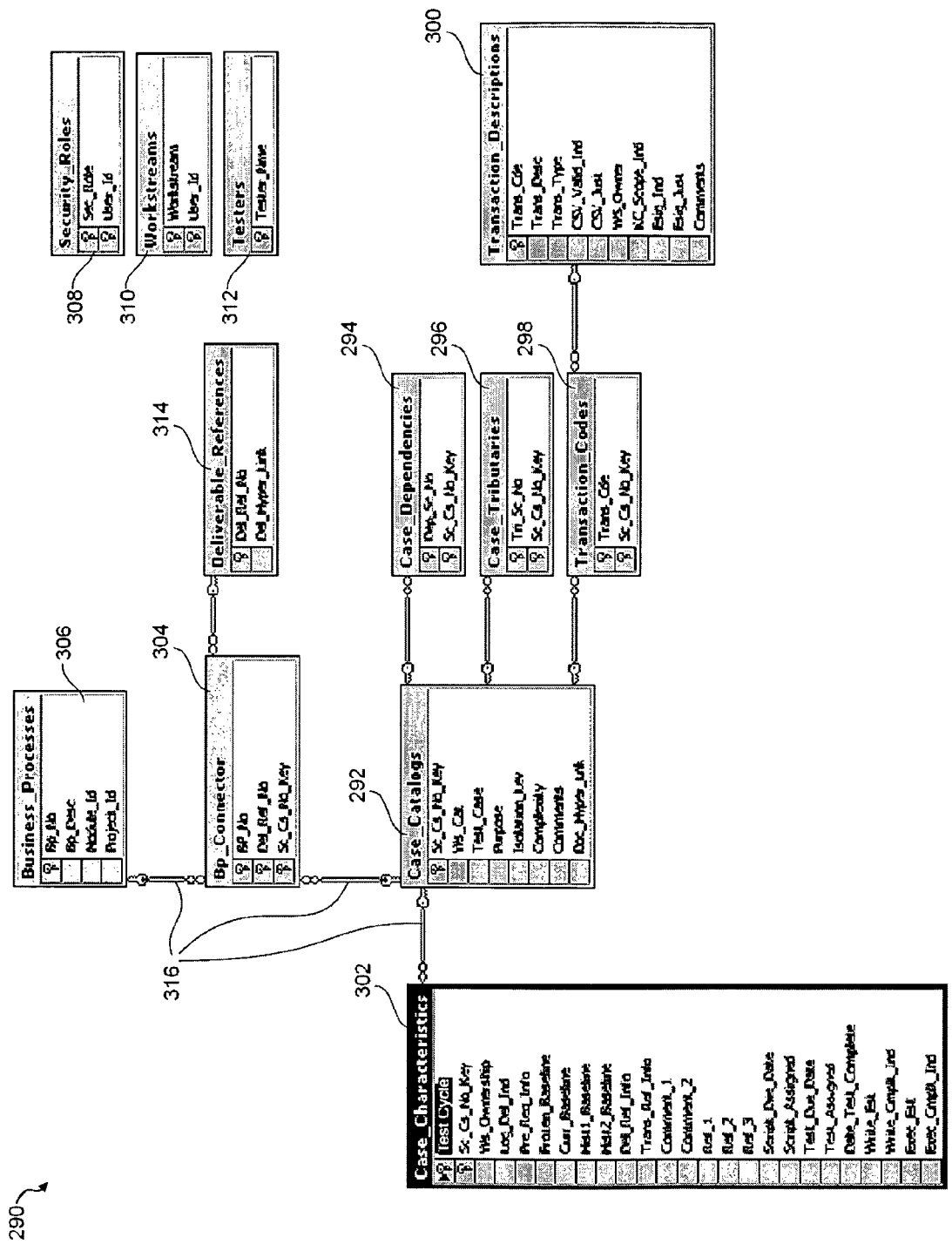
FIG. 11 representatively illustrates an exemplary Entity Relationship Diagram.

FIG. 11 depicts an Entity Relationship Diagram 290 showing connections between the test cases and the business processes supported by the test cases. This diagram shows the logical relationships between structures in the Automated Multidimensional Traceability Matrix that maintain relationships between components of the complex software system and the associated development or implementation projects. In the Entity Relationship Diagram 290, Test Case Catalogs 292 are linked to dependencies 294, tributaries 296, and associated transaction codes 298 for the transactions (software modules) that are executed for each test case, and transaction descriptions 300 are associated with each transaction code 296. Case characteristics 302 are also linked to each case via the Test Case Catalog 292 to provide additional information; connecting bars 316 represent the connection. The relationship between the case catalogs 292 and business processes 306 and objectives of the project ("deliverable references" 314) is also maintained with connectors ("Bp_Connector" 304), which is a function that can be achieved by traditional traceability matrices (showing how targeted functionality in the software is achieved by elements of the software). The Automated Multidimensional Traceability Matrix therefore can include the features of known traceability matrix approaches, in addition to providing significantly improved flexibility, traceability, and power in dealing with relationships between test cases and transactions/software modules across multiple levels.

General information about security roles 308, workstreams 310, and testers 312 is also provided in the embodiment of the Entity Relationship Diagram 290 shown in FIG. 11, and can be a function of the project or testing environment (e.g., cycle) for the testing work. Any other desired information can be displayed or linked to the entities shown, as appropriate.

Figure 12:
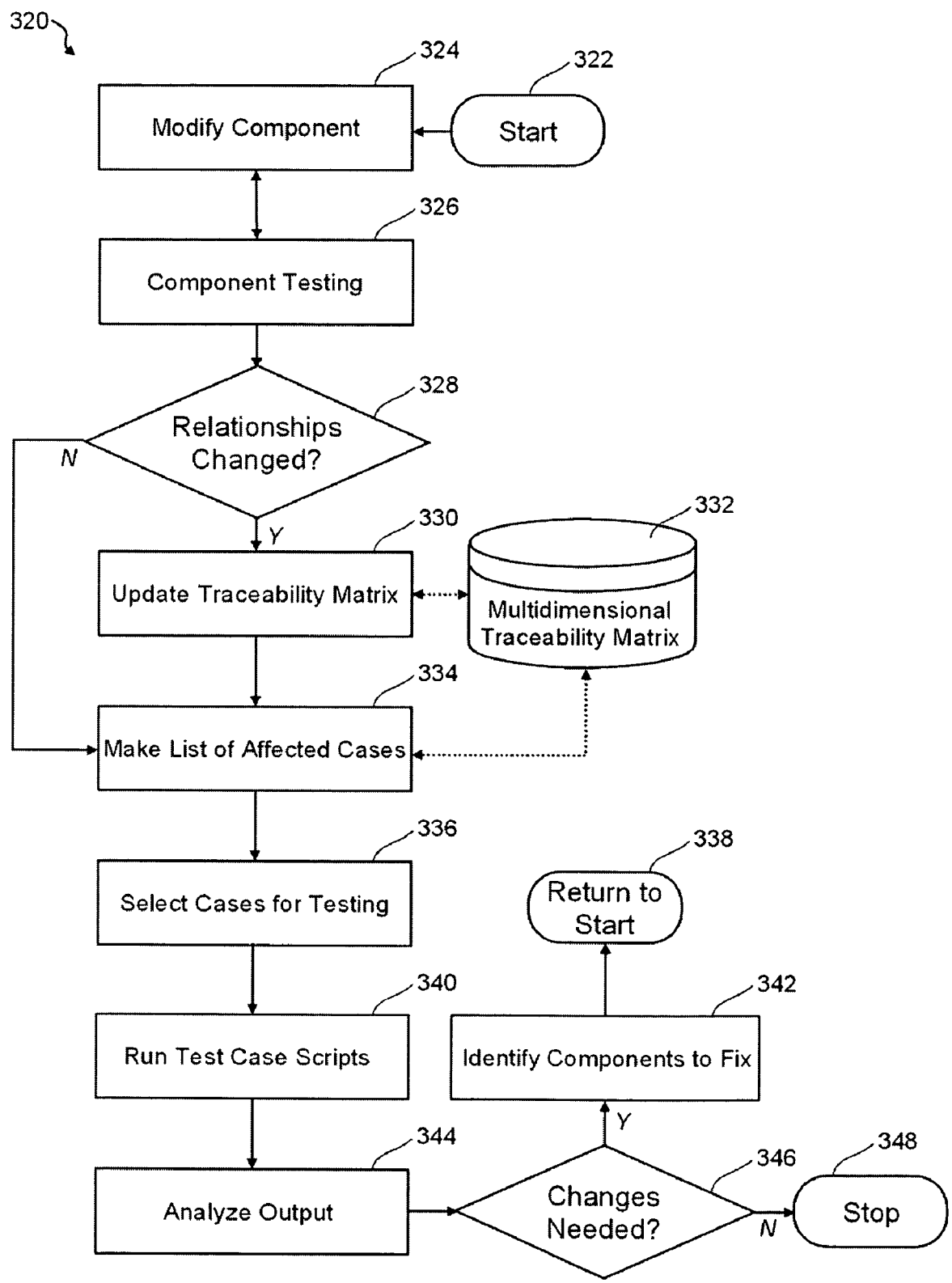
FIG. 12 representatively illustrates an exemplary flowchart for a method of using an Automated Multidimensional Traceability Matrix of the invention.

FIG. 12 depicts a flowchart for a method of using an Automated Multidimensional Traceability Matrix 320 showing one aspect of the method of the present invention. The method begins 322 with modification 324 of a component of a complex software system. Individual component testing 326 may then follow to ensure that stand-alone aspects of the component are functioning prior to testing its performance with other software modules. Then, it must be determined if the modifications to the software component have changed any relationships 328 between the components of the complex software system (i.e., between the test cases in the Traceability Matrix). If any relationships have changed (e.g., new dependencies or tributaries), the Traceability Matrix can be correspondingly updated 330. The Automated Multidimensional Traceability Matrix tool 332 is then applied to determine which test cases in the Multidimensional Traceability Matrix may be affected by the modified component, yielding a list of affected or "suspect" cases 334. All of these cases may then be run in regression testing, or a subset may be selected 336 based on the importance of the cases or their proximity in the chain of dependencies to the modified component (e.g., one may wish to only test cases that are within two, three, four, or five or-some other predetermined number of steps of the case that tests the modified component). Running the tests generally requires the use of test case scripts. After the scripts are executed 340 to run the tests, output results are analyzed 344 and compared to expected results to determine if any changes are needed in the code 346. If the results indicate no changes are needed, the task of modifying and testing a component may be considered to be completed 348. If further changes are needed, steps are taken to identify the component or components of the complex software system that require modification 342 (typically the recently modified component is most likely to require further debugging or other modifications, especially if the complex software system was working acceptable prior to modification of the component). Then, the cycle of component modification and testing with the help of the Automated Multidimensional Traceability Matrix can proceed.

Regarding the flow chart of FIG. 12 or any other flow chart herein, when appropriate, two steps that are depicted as sequential in the flow chart herein may be executed concurrently, together (i.e., combined into a single step), or in parallel, and, unless otherwise specified, in cases where the order of two or more steps is not crucial to success, the two or more steps may be executed in whatever order one skilled in the art may find appropriate.

Figure 13:
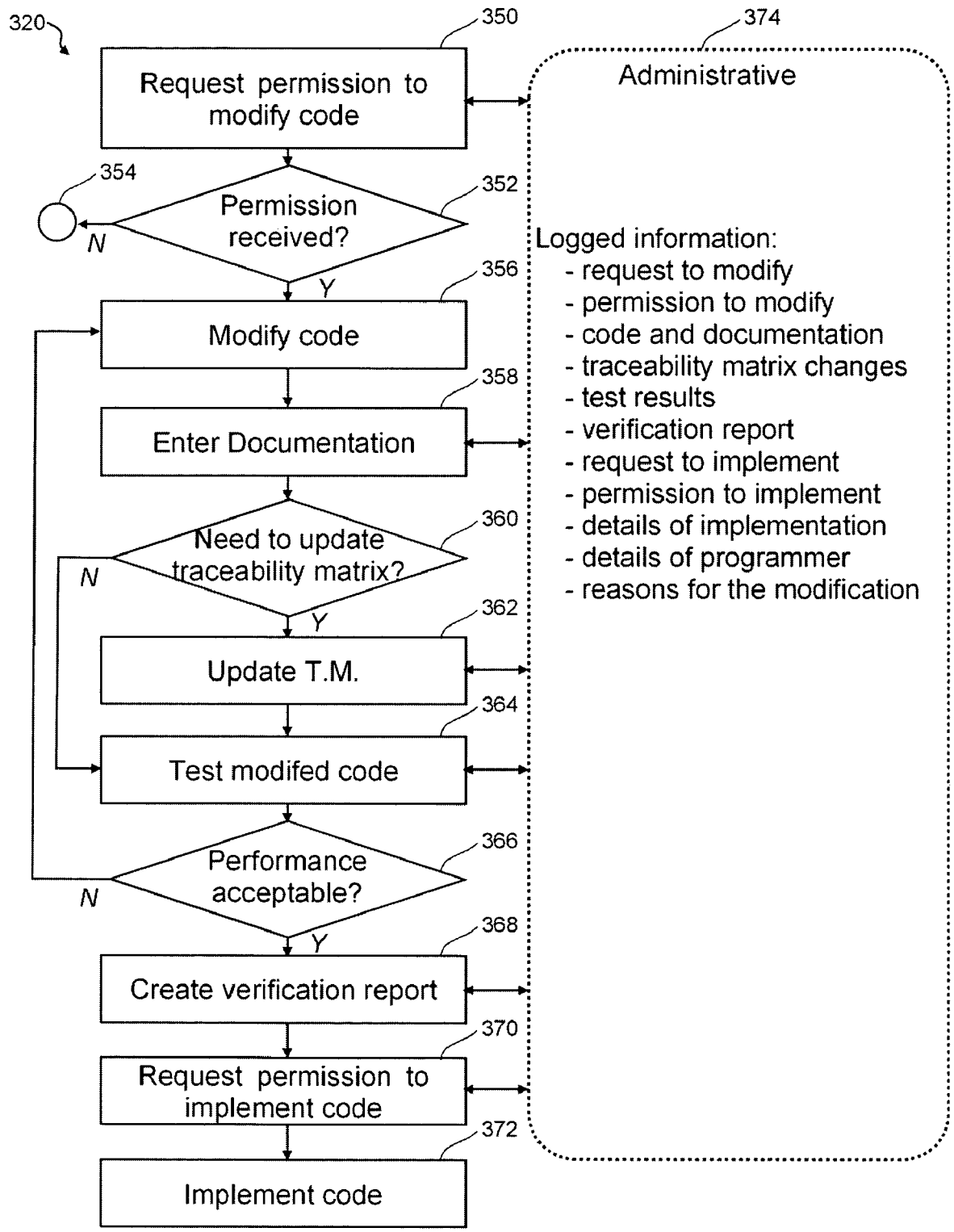
FIG. 13 representatively illustrates an exemplary flowchart for a method of using an Automated Multidimensional Traceability Matrix of the invention.

FIG. 13 depicts a flowchart for a method of using an Automated Multidimensional Traceability Matrix 320 showing communication to an administrative entity 374 for overseeing authorization and creation of audit trails during a work project that includes modifications of a complex software system. During such a project, a group member, team, or other agent requests permission to modify code 350 in the complex software system. If permission is received 352, the code is then modified 356 (if not, the project is on hold 354 until further action is taken). Either after or during modification of the code 356, documentation is provided 358 for the administrative entity 374, which can entail downloading time-stamped and archived files to and administrative server and thereby (or by other means) detailing the changes made, giving the original and modified code segments, identifying the objectives of the change, specifying the associated test cases, etc. The parties modifying the code or other parties should then determine if the Automated Multidimensional Traceability Matrix requires updating 360 (e.g., have any of the relationships identified in the Traceability, Matrix been modified, or have new relationships been created?). If so, the Traceability Matrix is updated 362 and the updates are again shared with the administrative entity 374, providing all desired information. The modified code is then tested 364 (if the Traceability Matrix did not need to be updated, the step of updating the Traceability Matrix 362 is skipped and the modified code is then tested directly 364). Test activities and results are shared with the administrative entity 374. If the performance of the code is found unacceptable 366, the code may need to be modified again 356 and then steps 358 through 366 are repeated. If the performance is acceptable 366 (e.g., the regression tests pass, or regression tests plus newly designed tests pass), then a verification report can be created 368 and shared with the administrative entity 374 to document the successful modification and testing and of the code. Permission can then be requested to implement the successfully modified code 370. If granted, the code can be implemented 372, which may entail updating the version number of the code or of a modified module. In some cases, a new baseline for future regression tests may be needed and can be created (not shown).

The administrative entity 374 can include human supervisors or project managers and associated hardware (e.g., servers and networking systems) and software (e.g., relational databases, electronic signature tools, time-stamping and archiving software, project, management tools, CSV systems, etc.).

In another sense, the present invention comprises a method for documenting the entry of data pertaining to relationships between program modules for a complex software system, which is tested by running selected test cases. Thus, when an operator access as Test Case Catalog Maintenance Form to enter information about relationships of the test case to other components, a record is created in an Auditing Database (not shown, but belonging to the Administrative Entity 374) to record who entered changes, what the changes were, and when the changes were entered. The Auditing Database may also include a pointer to an archived copy of the original and modified versions of the Test Case Catalog entries for the test case in question.

Figure 14:
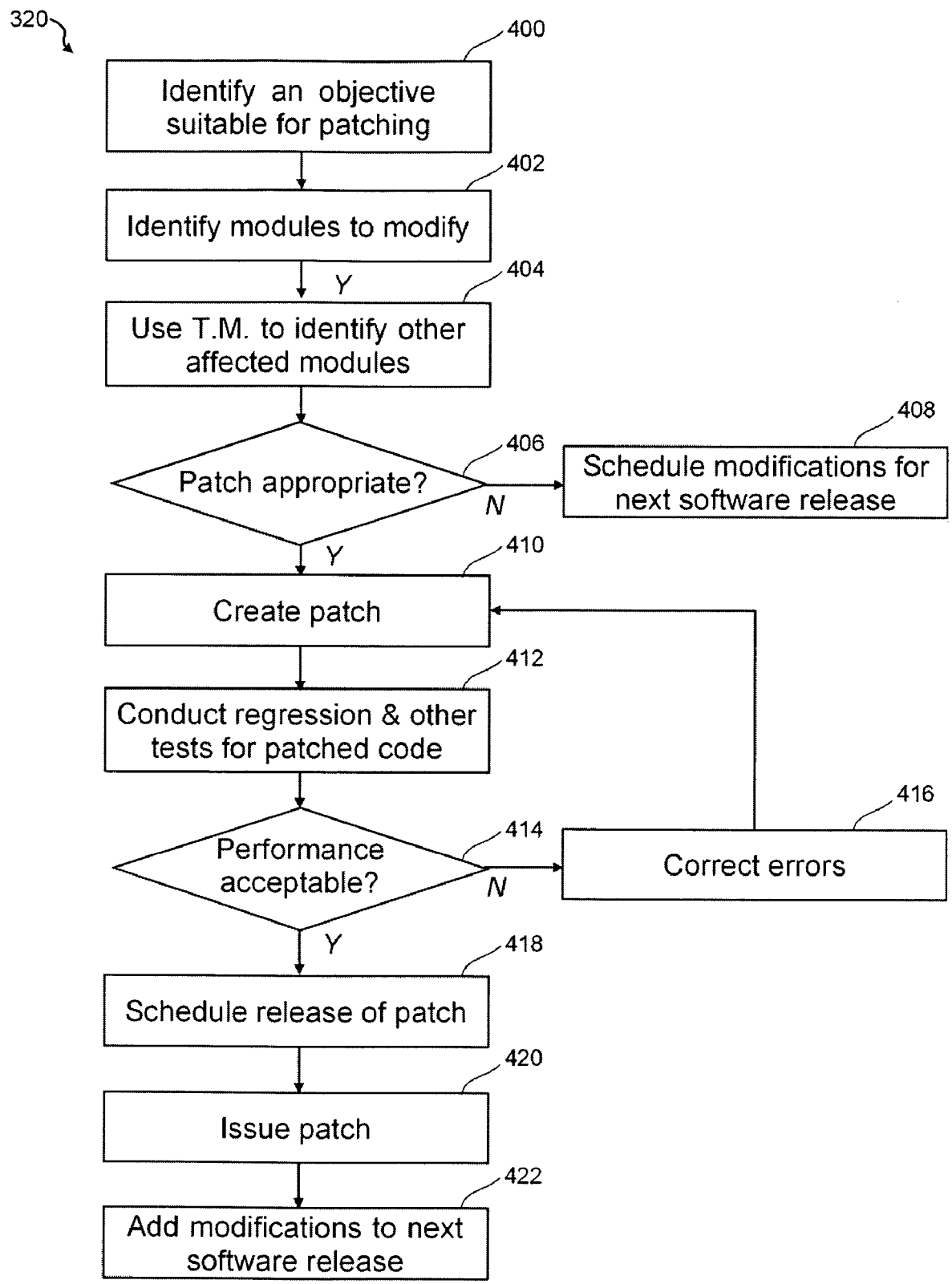
FIG. 14 representatively illustrates an exemplary flowchart for a method of using an Automated Multidimensional Traceability Matrix of the invention.

FIG. 14 is a flowchart for a method of using an Automated Multidimensional Traceability Matrix 320 in creating patches for existing software. As used herein, the term "patch" typically refers to an executable program that, when executed, modifies or replaces one or more existing software modules of a program comprising multiple modules or of a software system comprising multiple programs, rather than requiring complete installation of a new release of a program or software system. For systems in which uncompiled program code is available to users, the patch may entail one or more segments of text to replace portions of the program code, after which the user can compile the patched code to create an executable file. A patch may repair one or more known bugs, modify a driver for improved compatibility with other hardware, add new functionality (e.g., including a spell check for a text entry field), improve aesthetics (e.g., modified graphics for some modules), limit previously available functionality, enhance security, etc. Patches tend to be relatively minor in scope compared to new releases of a software system.

In the method 320 of FIG. 14, an objective suitable for patching is identified 400 (e.g., correction of a bug, etc.). Typically this will entail documentation of the problem and receiving appropriate permissions from an administrative entity (not shown) to proceed with the project, coupled with review of the scope of the work required and its suitability for release as a patch. The modules that need to be modified are identified 402 (this may also occur concurrently with identifying an objective suitable for patching). The Automated Multidimensional Traceability Matrix ("T.M.") is used to identify the other software modules that may be affected by the changes 404. At this point, it may be appropriate as an optional step to consider whether the patch is appropriate 406 given the scope of the project, based on the modules that may be affected. If a patch is no longer deemed appropriate, the proposed changes can be included in the next software release 408 rather than in the form of a patch (in which case, several additional steps can be executed, none of which are shown, such as implementing the changes, adding other changes and additions, testing the modified code, approving the release, and issuing the new release). If a patch is appropriate, the patch can be created 410. Those skilled in the art will understand the various approaches that can be taken to create the patch, such as using automated tools to compare a modified software modules with the original software modules to automatically create an executable code to replace the changed portions of the binary code in the original module, or using tools to generate installation software to replace the original module with the modified module, and so forth; similar approaches can be carried out when the patch is applied to uncompiled code that is subsequently compiled by the user.

After the patch is created 410, the patched code can be tested 412. This may involve manual tests of new or modified functionality to ensure that the objectives of the patch have been met, plus regression testing to ensure that previously functioning code still functions as expected. Results from the previous use of the Automated Multidimensional Traceability Matrix to identify other affected modules 404 can be applied to identify the test cases to be run in regression testing; alternatively, since the scope of the affected cases may differ by the time the patch is actually created due to unexpected changes that were needed, the step of conducting regression tests 412 may also include again using the Automated Multidimensional Traceability Matrix (e.g., in the form an Analysis Roadmap Tool) to identify the test cases that need to be tested in the regression testing 412. If the results of the testing show acceptable performance 414, the project can proceed with steps such as scheduling the release of the patch 418, issuing the patch 420 (e.g., making it available on a server connected to the Internet for downloading, or providing it in other computer readable media such as a CD Rom, a floppy disk, an e-mail attachment, etc.), and incorporating the modifications for the patch into the next release of the software 422, which may involved steps similar to those (not shown) associated with step 408.

In one embodiment, the successfully tested and approved software patches can be used to automatically update the code on one or more computers, such as by automatically applying a patch over a network connection to update a target computer. Alternatively, the update can require manual action by a user or administrator for the target computer. Principles of an exemplary ERP updating system are given in the whitepaper, "Total Ownership Experience for PeopleSoft Enterprise," October 2004, PeopleSoft, Inc. (Pleasanton, Calif.), herein incorporated by reference to the extent it is noncontradictory herewith.

Figure 15:
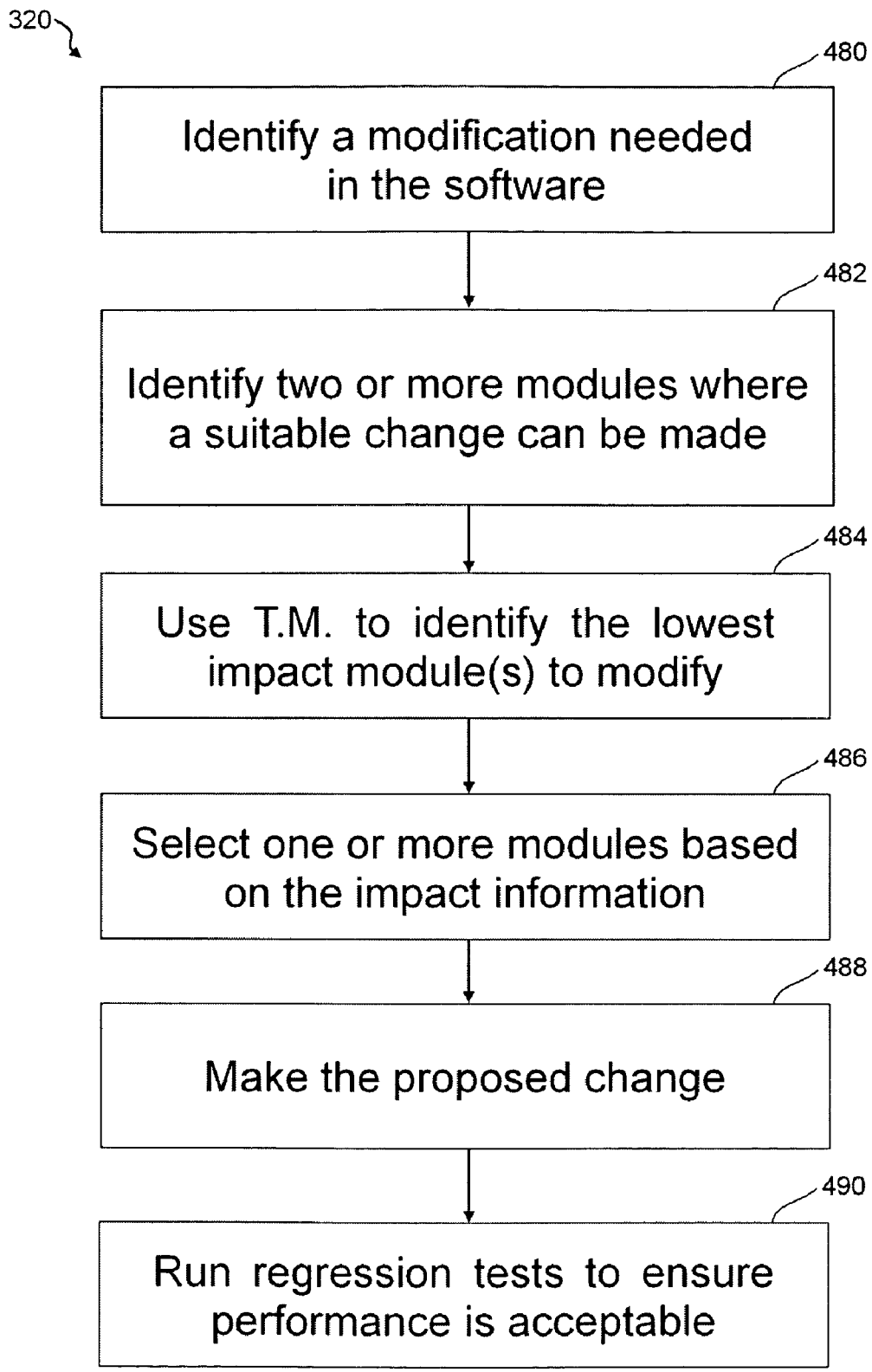
FIG. 15 representatively illustrates an exemplary flowchart for a method of using an Automated Multidimensional Traceability Matrix of the invention.

FIG. 15 is a flowchart for a method of using an Automated Multidimensional Traceability Matrix 320 in creating selecting which software module to modify. When a needed software modification has been identified 480, there are times in which a programmer skilled in the art may have a choice of which one or more software modules may be modified to successfully implement the change. For example, in a hypothetical e-commerce application, a feature that compares a user's identity with previous mail-order customer information may be incorporated into a log-in module, a cookie reading module, a checkout module, or a billing module of the e-commerce software system. Such decisions are often made based on convenience or may be guided by the individual tastes of the programmer or other criteria. What has often been overlooked in the past is how the choice between two or more acceptable alternatives may affect other software modules in unexpected ways, or how the choice may affect the cost of subsequent testing, particularly regression testing. One criterion that can be helpful in making such a decision is the degree of impact on other modules that a software change may have. More particularly, if the programmer has a choice between two or more modules to modify, wherein first module's tributaries and dependencies encompass a significant smaller number of other modules than those of the other modules, then it will tend to follow that choosing the first module to modify will result in less demanding (less costly) regression testing and generally may result in decreased likelihood of unexpectedly altering the performance of many other modules.

In the method 320 of FIG. 15, after the needed software modification is identified 480, in a situation where a choice can be made between two or more identified modules that may be chosen for the software change, the modules are identified 482 and then the Automated Multidimensional Traceability Matrix of the present invention is used to identify the lowest impact module or modules 484. This can include ranking all the modules based on the number of other modules that may be affected (e.g., within 1, 2, 3, 4, 5, or more levels of dependency and optionally 1 level or more for tributaries), and/or an estimation of the magnitude or cost or complexity of regression testing for the set of affected cases. After identifying the lowest or lower impact modules 484 of the identified modules from step 482, a selection of one or more modules is made 486 based on the information provided in step 484. The selected module or modules can be the lowest impact module or modules, or modules that did not have the greatest impact but did not necessarily have the lowest impact because of other considerations such as accessibility of the code (e.g., source code may be restricted), contractual relationships with software providers, difficulty in making the modification, possible conflicts with other aspects of the module, etc. The proposed change is then made 488, and regression tests are run 490 as well as other tests, if needed, to ensure that performance of the software is acceptable. The software may then be implemented (not shown), released, and so forth.

Figure 16:
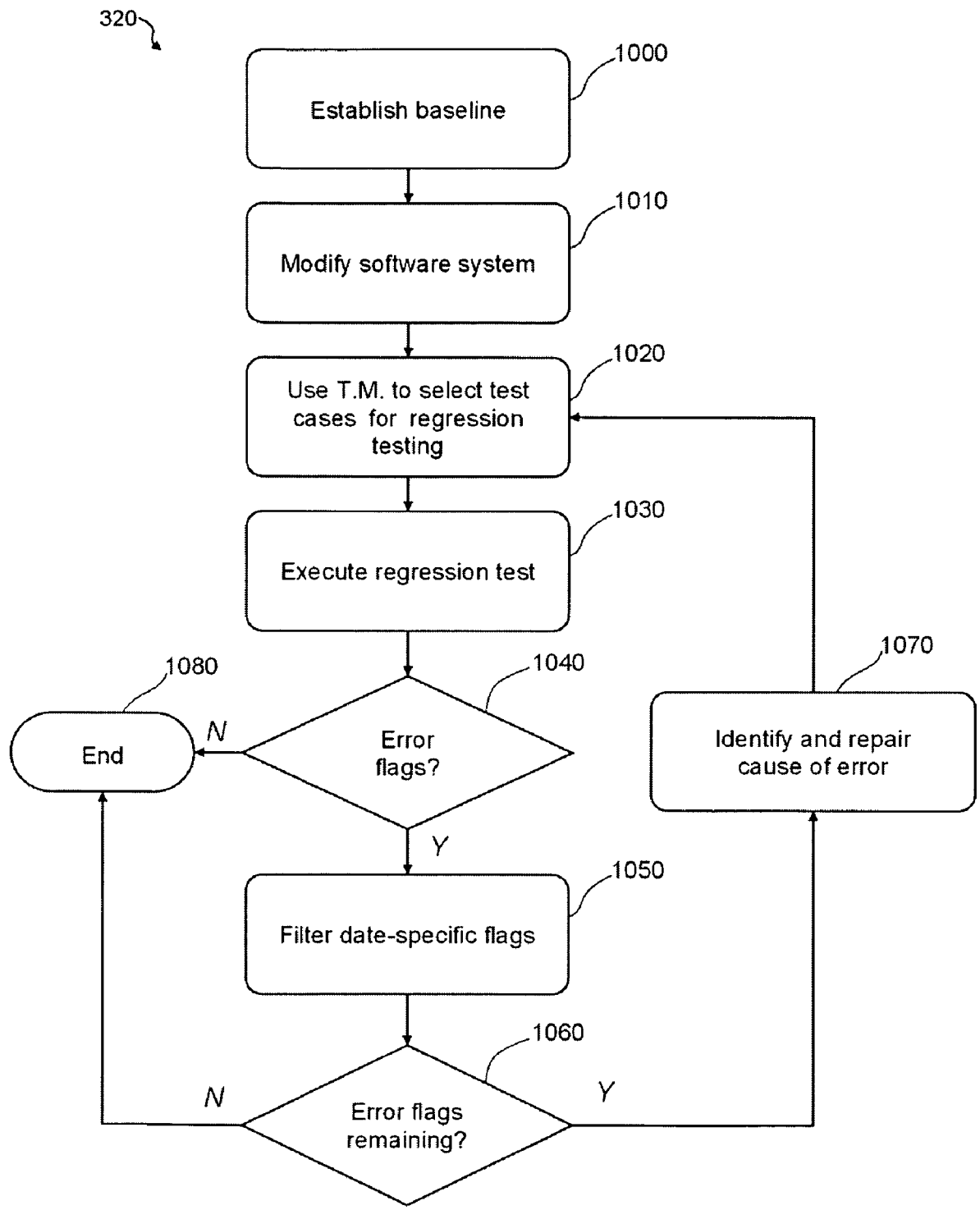
FIG. 16 representatively illustrates an exemplary method of performing regression testing on a complex software system.

FIG. 16 illustrates a method of performing regression testing on a complex software system. Before further changes are made in the complex software system, a baseline is established 1000. The baseline is the combination of test cases, the data sets to be used by the test cases, and known results for the test cases. The baselines provides a means to compare subsequently obtained results from the regression testing to see if previously established performance is maintained. The process of establishing a baseline may require significant effort in constructing test cases and data sets, but those skilled in the art will be able to readily execute such tasks. Following establishment of the baseline 1010, the complex software system is modified 1010. The modification can include incorporation of updates from vendors, improvements in interfaces, addition of new hardware or drivers, expansion of a network, updating operating systems, incorporation of new modules for functionality outside the scope tested by the regression test, bug correction, and so forth.

The modification to the software system 1010 typically will include a change in one or more software modules that are associated with one or more test cases. An Automated Multidimensional Traceability Matrix is then employed to select test cases 1020 that need to be executed to test the complex software system to ensure that previously established functionality is still available and operating properly. In one embodiment, a computerized Analysis Roadmap associated with the Automated Multidimensional Traceability Matrix is used to select affected test cases for execution.

Once the test cases for regression testing have been selected 1020, the regression test is executed 1030. This can be done automatically, manually, or by a combination thereof. The results of the regression test are then compared to the baseline to determine if there are any error flags 1040 (an identifiable discrepancy between the expected results of the baseline and the actual results of the regression test). If not, the regression test is successful and can be ended 1080 for this stage of the project. If there are error flags, it is possible that the discrepancies may be acceptable ones, such as readily explainable differences due to the fact that the regression test was executed on a different date than the baseline. For example, execution of a check generation module may place the present date on records for check requests, which will differ from the corresponding records in the baseline, but in an expected or readily explainable way that is not indicative of an error needing correction. Thus, date-specific flags may be filtered 1050 (or, more generally, "expected" differences can be eliminated from consideration in determining if the baseline functionality is still present. (For many embodiments, the filtering out expected differences can be considered to be generally included in the step of checking for error flags 1040, but is explicitly shown here for clarity.) If, after filtering of expected error flags 1050 there are still error flags in the regression results, an error has probably been introduced into the system. The error should then be identified and repaired 1070 using known techniques (debugging, program slicing, etc.). Once the error is believed to have been repaired, test cases are again selected using the Automated Multidimensional Traceability Matrix 1070. If repairing the error does not involve any modules other than those already covered by the previously selected test cases, then step 1070 may be skipped. The regression test is then executed 1030 to determine if there are still error flags (steps 1040, 1050, and 1060). If there are no error flags, the testing is ended 1080.

Figure 17:
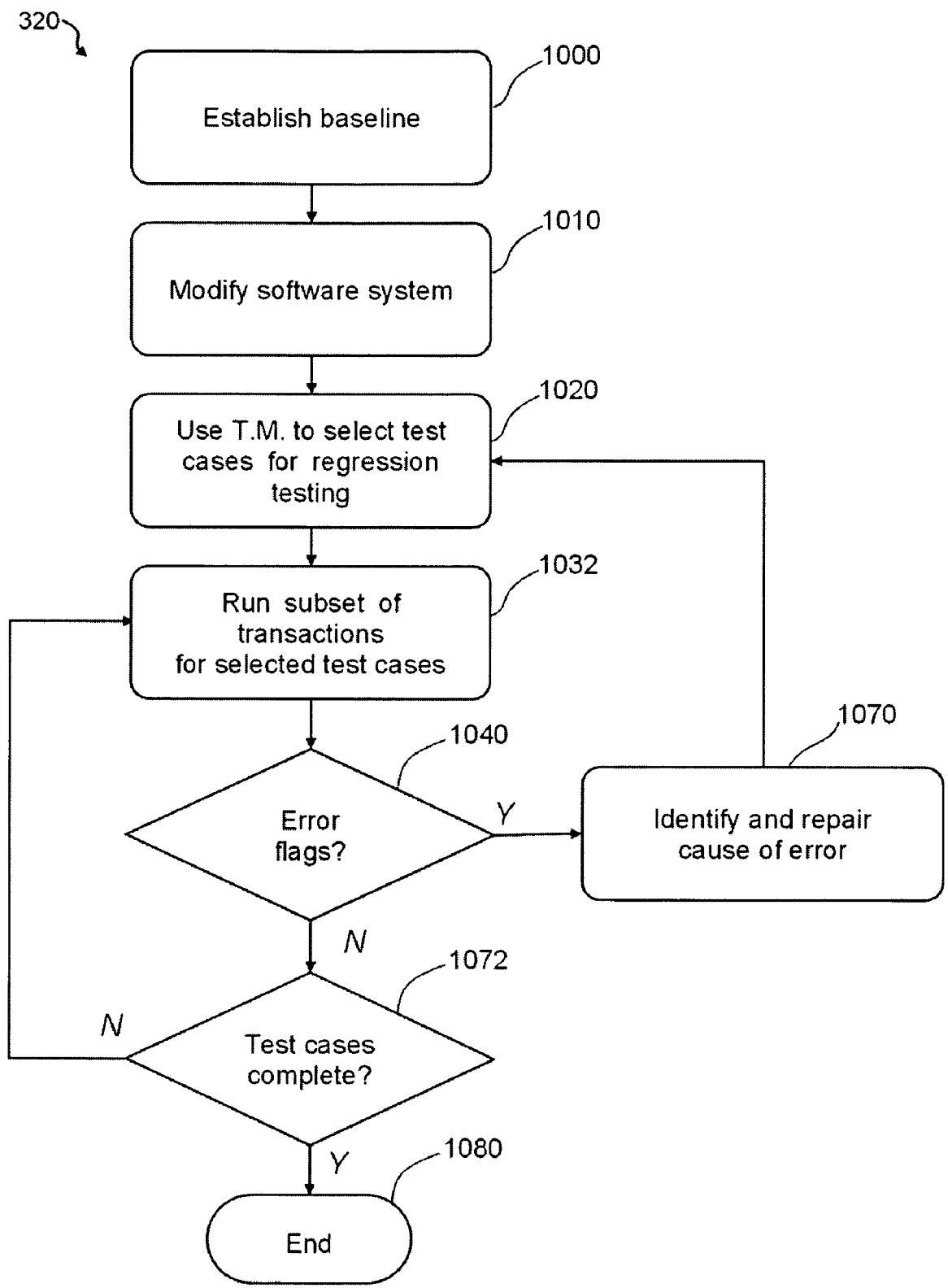
FIG. 17 representatively illustrates an exemplary flowchart for a method for testing complex software systems with an Automated Multidimensional Traceability Matrix of the invention.

FIG. 17 illustrates a method for testing complex software systems with an Automated Multidimensional Traceability Matrix in which regression testing is executed in stages with checkpoints along the way. As in FIG. 16, a baseline is established 1000, the complex software system is modified 1010, and the Automated Multidimensional Traceability Matrix is used to select the test cases that may need to be tested in response to the modification 1020. Rather than executing the entire regression test, a subset of the transactions in the selected test cases are executed 1032. The subset may comprise one or more entire test cases, or may comprise only a portion of the transactions to be executed for one or more test cases. The use of subsets allows checkpoints to be established to ensure that particular parts of the complex software system are operating. The results from the tested selection of transactions (or subset of test cases) is then compared to the expected results (in one embodiment, the baseline itself may comprise expected results grouped according to the subsets of transactions or test cases that are run). If there are error flags, the cause of the error is then identified and repaired 1070 and the subset of transactions can be retested. 1032, though if repairing the cause of the error 1070 changed the set of cases that should be considered, the Automated Traceability Matrix can be used to again select the test cases for regression testing 1020, from which a subset of cases can again be selected and tested 1032. If checking for errors 1040 yields no error flags, the next subset of transactions can be run 1032 and tested again for errors 1040 until the test cases are complete 1072 (the regression test is finished), ending 1080 the process.

Testing of SAP Systems

SAP® software systems represents a widely used example of a complex software system that can be tested with the tools of the present invention. Basic principles of SAP integration are well known to those skilled in the art and are disclosed, by way of example only, in the following resources:

*Successful SAP R3 Implementation: Practical Management of ERP Projects* by Norbert Welti, New York: Addison-Wesley Pub Co., 1999 (ISBN: 0201398249).

*SAP R/3 Implementation Guide: A Manager's Guide to Understanding Sap* by Bradley D. Hiquet, Kelley-Levey, Associates, and Anthony F. Kelly, Indianapolis: Macmillan Technical Publishing, 1998 (ISBN: 1578700639).

*SAP R/3 Process Oriented Implementation: Iterative Process Prototyping* by Gerhard Keller, Thomas Teufel, New York: Addison-Wesley Pub Co., 1998 (ISBN: 0201924706).

*Testing SAP R/3 Systems: Using the Computer Aided Test Tool* by Gerhard Oberniedermaier and Marcus Geiss, transl. Jason M. Miskuly, Harlow, England: Addison-Wesley, 2000 (see particularly pages 28-213).

*SAP: An Executive's Comprehensive Guide* by Grant Norris et al., New York: John Wiley and Sons, 1998 (ISBN: 0471249920).

Interfacing of custom software with SAP/R3 systems is described by B. Yeager in "Mead's ERP System Integrates 'Best of Breed' Software," *PIMA's North American Papermaker*, vol. 82, no. 4, April 2000, p. 36. For example, custom software components may be integrated with SAP brand software using SAP® brand software interface programs called "BAPIs"(business application programming interfaces), which use Microsoft Corp.'s.COM/DCOM connectors, allowing a Microsoft-based client to communicate with SAP R/3. Such connectors may be built using ACTIVEX® brand technologies by Microsoft Corp. and COM/DCOM strategies. Other aspects of applying a SAP brand software system for use with the present invention are disclosed by O. Wieser in "Integration of Process Control Systems and Laboratory Information Systems Into the Logistic Chain," *Automatisierungstechnische Praxis*, vol.39, no.2, February 1997, pp. 26-28.

Several tools have been developed recently for automated testing of SAP® software and other software, and these can be used for various tasks of the present invention, if desired. For example, AutoTesterer, Inc. of Dallas, Tex., markets AUTOTESTER ONE® Special Edition programs for SAP® systems which is said to facilitate software testing of SAP® systems and specifically to capture tests which verify R/3 business processes and assure that data are properly processed by the system. Another tool that may be a useful tool for some aspects of the present invention is Mercury's TestSuite 4.0, which includes RAPIDTEST™ software for automatic generation and execution of test scripts. Mercury Interactive has also released versions of its software testing products, WINRUNNER® software and LOADRUNNER® software, designed for SAP R/3.

A SAP® system can also be integrated with REID systems to capture real-time information about products and packages. SAPConsole can be one useful tool in capturing RFID information. Additional tools for standard transactions involving RFID and SAPConsole are available from Peak Technologies. One such product is the Peak S/3 Interface, which enables R/3 system users to operate LES applications in a wireless setting.

SAPConsole is SAP's native character based radio frequency solution designed to translate graphical based (GUI) screens into character based screens. SAPConsole does not provide business logic. Such functionality is found within R/3. Development for SAPConsole transactions is performed inside the ABAP workbench. SAP delivers Console functionality in versions 4.6B and higher. SAPConsole requires a Windows NT server and telnet software that supports VT220 emulation.

Use of Code Repositories, Migration Control Tools, and Configuration Management Tools Configuration management (CM) tools are known to prepare systems for automated testing, such as managing documents and data associated with the testing. CM tools can be used to manage the test scripts and data sets in a catalog or library known as a "testbed." CM tools can preserve the integrity of the scripted procedures, track versions of software, and allow scripts to be reused and tracked. CM tools are described by Dustin et al. (pp. 305-306, 424-426). Examples of CM tools include IBM's RATIONAL® software products such as CLEARCASE® software. This tool is said to go "beyond version control to version every asset in the software development lifecycle. Rational CLEARCASE® software tracks changes to every file and directory, maintaining complete, annotated version histories assets including source code, binaries, executables, documentation, test scripts and libraries. Developers can quickly roll back to any previous build or baseline configurations to identify which versions of which files triggered a specific change." A checkin/checkout development model is included, with versioning of directories, subdirectories and all file system objects with a versioned object database that is said to ensure that the right users are accessing the right files.

Migration control tools can be adapted for the present invention to enhance code security and to strengthen an audit trail of software changes. Principles of migration control tools are described in U.S. Pat. No. 6,601,233, "Business Components Framework," issued Jul. 29, 2003 to Underwood, herein incorporated by reference to the extent it is noncontradictory herewith. According to the Underwood patent, migration control tools provide a means to control multiple versions of source code, data, and other items as they are changed, tested, and moved from one development environment into another, such as from early development to testing or from testing to production. In general, migration control tools such as those described in the Underwood patent can be used to allow software developers to check out existing code from a software repository prior to making modifications, and to meet established criteria and receive authorization from a project leader or other source to check the modified and successfully tested software back into the repository, where it will be associated with additional information that may include a new version number, documentation of the changes made and the parties who made them, reasons for the changes, dates of the changes, lists of test cases examined, identification of weaknesses or future enhancements to consider, and certification of satisfactory performance in unit testing, regression testing, or other tests. When the build code is deemed fit, the source code can be checked into the source code repository and the source code administrator is notified of the status.

Regression testing may be done with a full version of the software or with a lightweight version containing only components required for testing (these may be copies of the approved components). Different workstation configurations may exist for component or user interface developers or others doing testing on subsets of the software system. All developers involved may use a source code repository for check in/out of code during development. In the event that the required modifications affect both a user interface and server-side components, then the developers may share components and interfaces using drive mappings.

Automated document generators can also be used, such as the SoDA (Software Documentation Automation) system of IBM's RATIONAL® software group.

Executing Individual Regression Tests

The execution of regression testing according to-the present invention can be assisted by known automated testing tools that can examine the test results from a test case or help execute the testing called for by a test case. One example that can be applied to the present invention is that of U.S. Pat. No. 5,758,062, "Method and Apparatus for Regression Testing of Application Logic," issued May 26, 1998 to McMahon and Buzsaki. The McMahon and Buzsaki patent describes a method and system for regression testing of application logic within a software system. Software architecture, according to the authors, can be separated into a presentation layer (e.g., user interface), an application layer (e.g., business logic), and a data/storage layer. Within the novel testing system, communication interfaces between the presentation layer and the application layer are identified such that user initiated commands ("events") passed from the presentation layer to the application layer are recorded into a test playback event file. During test playback event recordation, differences in the state of the application layer of a reference program are collected into a reference state log file. To test a program, the recorded events of the test playback event file are played back and applied directly to its application layer. After each event, the differences in the state of the program are collected into a test state log file. The reference and test state log files are compared and differences are stored in an error or summary difference file. By recording events that enter the application layer, in lieu of the user entered commands that enter the presentation layer, the testing system is said to be insensitive to changes in the presentation layer and allows more direct testing and error detection of the application layer. By recording differences in the state of the application layer on an event by event basis, in lieu of recording differences in information presented to the user, the system is said to allow more effective error detection and error isolation of the application layer.

Also of potential use in the present invention is the automated testing system U.S. Pat. No. 5,781,720, "Automated GUI Interface Testing" issued Jul. 14, 1998 to Parker et al., herein incorporated by reference to the extent that it is non-contradictory herewith. The Parker et al. patent describes a method for automated testing of both new and revised computer application programs which use a Graphical User Interface (GUI). Simulated user events such as keyboard or mouse actions are automatically input into the GUI interface. The GUI is then monitored to observe the changes to the GUI in response to the input. Also used are a test script that is written in a high level programming language, a test executive which executes the test script, and a test driver which provides the interface to the GUI. The test script is directed towards operation on logical objects, instead of GUI-specific references. The primary responsibility of the test executive is to convert GUI-independent references into GUI-specific references. The test driver takes the GUI-specific references from the test executive and performs the actual interface to the GUI objects. A uniform hierarchical naming scheme may be employed to identify each Logical Screen Element (LSE) under test, LSEs being the objects used in the GUI environment to interface with the user.

The generation of scripts to execute test cases can include the use of known software testing tools that capture and replay input of users during data entry or other aspects of software entry. In one embodiment, the scripts or other aspects of test case generation or execution employ the software tools of U.S. Pat. No. 6,061,643, "Method for Defining Durable Data for Regression Testing," issued May 9, 2000 to Walker et al. The Walker et al. patent discloses a method and computer product for facilitating regression testing during the development and other life cycle phases of a software application comprised of transactions. A regression test is comprised of test cases containing test data describing the target test at a functional or behavioral level. A test operator may perform a manual test and simultaneously record the test. The architecture of the Walker et al. patent monitors the physical activity of the test operator and thereafter transforms the physical event steps (e.g., mouse clicks or keystrokes) into functional or behavioral test data (e.g., entering a value into a named field). The test data is in a robust functional description of the transaction such that physical modifications to the transaction during software development (e.g., changing the appearance of the user interface and the location of fields and buttons on the screen) preserve the viability of the test data for execution in the modified transaction. A test report may also be generated in response to the execution of a regression test. The test report lists both the test data executed and the response thereto. A test report may be compared with a baseline or control test report to verify the lack of regression of the transaction. A difference report may also be generated from the comparison of test reports. The system of Walker et al. may be described as a, method for regression testing a transaction using a test case comprised of test data wherein said test data describes said regression test at a functional level and executes said regression test at a physical level and wherein said test data remains executable when a physical modification to said transaction occurs that changes, a physical level of said transaction.

This method for regression testing comprises:
(1) reading the test data of a test case described at said functional level;
(2) evaluating the transaction to determine test functionality corresponding to the test data;
(3) translating the test data into transaction events necessary to perform the test functionality as identified in said evaluating step; and
(4) driving the transaction with the transaction events to execute said test data at said physical level.

Another automated tool that can be used in the scope of the present invention is that of U.S. Pat. No. 6,192,108, "Performing Automated Testing Using Automatically Generated Logs," issued Feb. 20, 2001 to Mumford et al. The patent of Mumford et al. describes a system for automated testing of service applications using automatically generated logs, so that new testing applications do not need to be created for each new release of a service application, and provides for testing of various aspects of the application by accounting for all data and processes performed. An automated regression tester captures and records data generated by the execution of an initial version of the application being tested. This data is recorded to a first test log. When a new or ported version of that application is developed, the first test log is used by the automated regression tester to generate output that emulates the operating environment, including caller and user input, of the application. The processing of the new/ported version of the application is captured and recorded to a second test log. The automated regression tester then compares the second test log to the first test log and reports any discrepancies in data (e.g., in a difference report). Such discrepancies may indicate a bug in the new/ported version of the service application.

When testing involves interactions with hardware such as printers, tape drives or other mass storage media, CD or DVD read or write devices, additional servers, sensor systems, process control devices, robotics, RFID readers, digital cameras, video cameras, automated guided vehicles (AGVs), and so on, the testing may interact directly with the hardware, or may use hardware mimicking devices or software such that the electronic response of the hardware is mimicked without the hardware actually interacting with the code being tested. This can be particularly useful, for example, when the hardware that interacts cannot afford to be shut down or adversely affected by the software in development, making a hardware simulation test more practical for testing, at least in the early stages of the product's lifecycle. Some principles for hardware simulation are discussed in U.S. Pat. No. 5,953,519, "Method and System for Generating Electronic Hardware Simulation Models," issued Sep. 14, 1999 to Fura, herein incorporated by reference to the extent that it is noncontradictory herewith. Further principles, which may be used within the scope of the present invention, are disclosed in US patent publication US20010049594A1 , "Method and System for Hardware Simulation," published Dec. 6, 2001 by R. L. Klevans, herein incorporated by reference to the extent it is noncontradictory herewith. Klevans describes a system and method for simulating a networked system for testing of embedded software on an emulated hardware device. The system provides for automated generation of a simulated hardware and facilitates testing of embedded software response to simulated error conditions created by the simulated hardware. Communications from the embedded software are intercepted at a low software level and redirected from the emulated hardware device to the simulated hardware.

Yet another tool that can be used for automated testing is that of U.S. Pat. No. 6,301,701, "Method for Computer-Assisted Testing of Software Application Components," issued Oct. 9, 2001 to Walker et al. This patent describes a method and computer product for facilitating automatic testing in which a transaction tester evaluates the integrity of a transaction by generating test data from the definition of the transaction under test. Typical values for fields may be included within the transaction definition and reused as typical test values. Test results are generated and compared against known-good values or, alternatively, against expected test results also generated from the transaction definition. Other software components may also be tested including menu structures. A definition of the menu structure is rigorously traversed such that each entry of each menu is thoroughly tested and reported. Results are, automatically compared and verified against known good results or test results are automatically reviewed. Both transaction testing and menu testing may be incorporated into regression testing.

Other tools that can be used within the scope of the present invention include link generators, which monitor software execution to identify modules that are called and to verify a traceability matrix.

Additional Embodiments

Statistical tools can also be applied to enhance the use of tests case in regression analysis. In one embodiment, all or some software modules are assigned a criticality parameter which reflects how important the respective module is relative to other modules. The assignment of a criticality parameter can be done automatically or assisted with automated tools, such as a software analysis program which generates statistics on code use to identify the modules that are used most frequently. In one embodiment, for example, a criticality parameter might range from 1 to 5, with 5 reflecting the most frequently used modules and 1 the least frequently used. Modules assigned a higher criticality parameter or otherwise known or determined to be of above-average importance can then be flagged for more rigorous testing when a change is made to the module or to a module or other factor that may influence the performance of the module (e.g., a dependency or tributary or both). For example, test cases invoking flagged modules can be subject to additional runs, such as additional runs with more than the standard variation in input parameters (e.g., for a changed module with a maximum criticality factor, a tester or automated testing system could execute runs with 10 different input scenarios instead of a lesser number, and a module with the lowest criticality factor might be tested with only one set of input conditions; the typical number of input parameter scenarios without consideration of the criticality factor might be, for example, one, two, three, or four). Alternatively or in addition, a flagged module can indicate that a higher level of tributaries and dependencies for associated test cases should be run in regression test to verify the absence of any unwanted ripple effects.

In another embodiment, the automated testing can also include a step of verifying the data in the Traceability Matrix to verify that the relationships expressed therein have not been modified by the changes made to the software, or that updated relationships entered in the traceability matrix are in fact accurate representations of the new software relationships. This can be done, of example, with commercial testing software that monitors the calls made by a software module. If a module is called due to a relationship not captured in the Traceability Matrix, or if a relationship in the Traceability Matrix is not identified through software calls, the possible error can then be identified, reported, and called to the attention of a supervisor. In some cases, the supervisor may recognize or determine that an actual existing relationship was not expressed during execution of the software because the conditions in the input parameters or other factors did not necessitate the call or transfer of data to another module. If a relationship in the Traceability Matrix appears to be in error based on the report of call monitoring software, further investigation will typically be needed to verify that a relationship has been incorrectly recorded. If a relationship has been missed, the detection of call to another module will generally affirmatively indicate a relationship, but the relationship may be due to an error that may require further verification. The results of such automated and human analysis can be entered into the software history records to create an audit trail or a troubleshooting mechanism.

The regression testing can, in another embodiment, also include stress testing to determine that the software works properly even when the system is heavily challenged by large computational demands. A variety of tools for stress testing are known in the art and can be applied as an additional step in the regression testing of complex software systems, especially when critical components are being modified (e.g., components with high criticality parameters).

The development, integration, and/or testing of a complex software system typically involved multiple programmers in a variety of groups. Effective communication between programmers and groups can be valuable for effective cooperation to achieve targeted tasks. Any known method can be used to strengthen communication and planning, including the techniques disclosed in U.S. Patent Publication 20040068714, published Apr. 8, 2004 by Deimel et al., herein incorporated by reference. Deimel et al. disclose an exchange infrastructure for message-based exchange and integration of a collection of heterogeneous software. The exchange infrastructure includes a repository for storing design-time collaboration descriptions of a plurality of software components and a directory for storing configuration-specific collaboration descriptions of a. runtime system landscape. The exchange infrastructure further includes a runtime engine configured for message-based exchange of information based on the configuration-specific collaboration descriptions. At runtime, the runtime engine receives messages, and resolves intended or required receivers based on message content and parameters provided by the configuration-specific collaboration descriptions from the directory.

Other Software Systems

Many other software systems can be included in the complex software system, such as by integrating with SAP based systems or with other software.

By way of example only, complex software systems to which the tools of the present invention can be applied may include any suite of applications for customer relationship management (CRM), including applications for partner relationship management (PRM) and employee relationship management (ERM). One such example marketed by Siebel Systems, Inc. (San Mateo, Calif.) is Siebel 7, an integrated suite based on a common Web architecture that is said to provide organizations with real-time analytical ability to track and understand both customer behavior and key indicators of corporate performance. The work of implementing and modifying the applications requires extensive testing which can be facilitated by the automated tools of the present invention.

The systems of the present invention can also be used to integrate innovation management tools into an enterprise system. For example, innovation management databases, electronic notebook systems, project tracking systems, docket management systems for a patent office within a corporation, patent databases, invention disclosure databases, and so forth can be brought together into a complex software system that can be tested and implemented using tools of the present invention. One example of a component that can be tested with the present invention are the innovation and information management tools of U.S. Pat. No. 6,801,818, "Distributed Product Development," issued Oct. 5, 2004 to by S. Kopcha; and U.S. Pat. Publication US20030093478A1, "Collaboration and Innovation System," published May 15, 2003 by L. J. Hughes.

Other integrated software systems may include commercial quality control software, such as TRAQ-1 Quality Data Management System of the Gibson-Graves Company, Inc, DBQ (Database for Quality) brand computer software from Murphy Software, and other quality control systems. Distributed control systems such as WONDERWARE® software Wonderware Corp., Irvine, Calif.) may be included. The complex software system may also include any known systems for purchasing, accounting, financial control, maintenance, regulatory compliance, etc. Such systems may include one or more of the interrelated software modules in the integrated complex software system.

Other systems that may be combined with the present system to extend functionality or serve as a portion of the testing system include the documentation management tools for ISO compliance described in WO 97/12311, "System and Method for Quality Management," published Mar. 4, 1997 by J. A. McFarland. Projects may also be assisted by known requirements management (RM) tools (See, for example, Dustin et al., pp. 206-211) such as Requisite Pro by Rational, DOORS by QSS of Telelogic North America, Inc. (Irvine, Calif.) (e.g., DOORS 7.1,), and RTM by Serena Software, Inc. RM tools may assist in managing the requirements of a software development project and help ensure that business objectives are met. Automated creation of a "requirements traceability matrix" (not to be confused with the Traceability Matrix of the present invention which describes the relationships between test cases and(or software modules) may be done with DOORS, for example, to link each test procedure with its respective test requirements.

Visual modeling tools such as IBM's RATIONAL ROSE® software can be used to visualize and document the artifacts of software systems and provide a blueprint for software construction. Business processes can also be mapped to software architecture.

Program-specific tasks can be addressed with known debugging and analysis tools, including program slicing, a tool for restricting the behavior of a program to a specified subset of interest. Program slicing is described by K. B. Gallagher and J. R. Lyle in "Using Program Slicing in Software Maintenance," *Software Change Impact Analysis*, edited by Shawn A. Bohner and Robert S. Arnold (Los Alamitos, Calif.: IEEE Computer Society Press, 1996, pp. 319-329). Tools for impact analysis can also be used, including those discussed by Shawn A. Bohner in "Software Change Impact Analysis for Design Evolution" in *Software Change Impact Analysis*, pp. 67-81, herein incorporated by reference. Tools for component dependencies can also be applied, such as cross-references, test-coverage analyzers, and source-code comparators discussed by Bohner and Arnold in "An Introduction to Software Change Impact Analysis," in *Software Change Impact Analysis*, pp. 1-26 (particularly p. 15). Such examples include Inscape, as discussed by D. E. Perry, "The Inscape Environment," *Proc. Intl. Conf. Software Eng.* (Los Alamitos, Calif.: IEEE Computer Society Press, 1989, pp. 2-12, as cited by Bohner and Arnold).

Any known tools for assisting in the generation of test cases or scripts may be used, including the tools discussed in US20040103396A1, "System for Verification of Enterprise Software Systems," published May 27, 2004 by S. Nehab, herein incorporated by reference to the extent it is noncontradictory. Nehab describes a system and a method for automatic verification of complex enterprise software systems, which improves the testing process by producing test scenarios using business process specifications.

EXAMPLE

An automated testing tool according to the present invention was developed for testing of SAP integration within Kimberly-Clark businesses. The system was Web-based, using secure Intranet pages for input and display of information. The software supporting the Traceability Matrix was implemented on a RDBMS SQL Server 2000.

Web functions were written using HTML and XML as markup languages. Style languages for control of information displayed were CSS and XSLT. Scripting languages were VBScript and JavaScript. Two-tier architecture was used, with ASP executed on a server and remote scripting triggered by client machines and executed on a server. Toolsets used included EXCEL, SQL Query, Access, and Crystal Reports. The Analysis Road Map was implemented with a hash function using link lists, recursion, and with the matrix represented in a three dimensional array. Referential integrity was maintained between dependencies and tributaries.

Construction Details of the Analysis Road Map

Access to a two-dimensional matrix element is accomplished with two subscripts: the first representing the row index, and the second representing the column index.

Using the test case selected from the Analysis Roadmap dialog box, its dependencies are retrieved from the database, via execution of a stored procedure, and mapped to the Dependencies Array, which contains the following field:
Dependency The Dependencies Array Two Dimensional Matrix contains the following information:
Dependencies (column, row)=Dependency [Parent Case]

Using the same procedure above, the test case and all of its dependencies tributaries are retrieved up to 6 levels and mapped to the tributaries array, which contains the following fields:
Level, Dependency, Tributary, and Children Indicator The Tributaries Array Two Dimensional Matrix contains the following information:
Tributaries (column, row)=Level [Next Six Levels]
Tributaries (column, row)=Dependency [Parent Case]
Tributaries (column, row)=Tributary [Child Case]
Tributaries (column, row)=Children Indicator [0—False: 1—True]

Hashing is an efficient means to quickly access data using a key value. Given an input, a hashing function manipulates it and produces a unique output. The key that is inputted is hashed, and the resulting output is a unique index number of the hash table that tells the program where to find the associated value. When more than one index is associated with each key, the result is a collision. This is handled with a technique called chaining, where data is stored in a node, and nodes are chained from entries in a hash table. This is accomplished with linked lists.

In constructing the Tributaries Array, tributaries are retrieved one level at a time. In order to prevent duplicate entries, each parent case is hashed and entered into a node. Before child cases are retrieved the parent case is hashed and one or more nodes are searched. If the parent case is found the tributaries for that parent case do not need to be retrieved; however, if it is not found the tributaries are retrieved.

Multidimensional arrays use additional subscripts for indexing. A three-dimensional array, for example, uses three subscripts:
The first references array dimension 1, the row.
The second references dimension 2, the column.
The third references dimension 3, the page.

Using the Tributaries Array, the scheduling information is retrieved from the database, via execution of stored procedures, according to the test cycle selected from the Analysis Road Map dialog box. The process and children indicators are set and all is mapped to the Tree Array, which contains the following fields:
Parent Case, Child Case, Child Description,
Logical Delete Indicator, Execution Date, Execution Indicator,
Reference Field 1, Reference Field 2, Reference Field 3,
Children Indicator, Processed Indicator The Tree Array Three Dimensional Matrix contains the following information:
Tree Array (column, row, page)=Parent Case
Tree Array (column, row, page)=Child Case
Tree Array (column, row, page)=Child Description
Tree Array (column, row, page)=Logical Delete Indicator
Tree Array (column, row, page)=Execution Date
Tree Array (column, row, page)=Execution Indicator
Tree Array (column, row, page)=Reference Field 1
Tree Array (column, row, page)=Reference Field 2
Tree Array (column, row, page)=Reference Field 3
Tree Array (column, row, page)=Children Indicator
Tree Array (column, row, page)=Processed Indicator XML elements employed in the automated tool of the present invention are shown in Table 1 below:

TABLE 1

XML Elements Employed in Example 1.

| XML Element | Element Description |
| --- | --- |
| <tree> | Signifies the tree root |
| <key id> | Number of the tree key |
| <highlight> | Highlights the starting key |
| <text> | Test cases are the keys |
| <schedule1> | Logical delete indicator |
| <schedule2> | Execution date |
| <schedule3> | Execution indicator |
| <reference1> | Used for referencing |
| <reference2> | Used for referencing |
| <reference3>< | Used for referencing |
| <description> | Test case description |
| <imageExpand> | Image to be used when expanded |
| <imageCollapse> | Image to be used when collapsed |
| <children> | Tributaries (other key element(s)) |

Using the Tree Array the XML file is constructed by two recursive methods: one to add keys to the root element (<tree>) and to the other key elements via the <children> tag, and the other to close keys with the required closing </children>, </key>, and </tree> tags.

An exemplary structure of an XML file related to the work in Example 1 is shown in Table 2.

TABLE 2

Portion of an exemplary XML file.

```
<?xml version='1.0'?>
<tree>
<key id='0'>
<hilight>None</hilight>
<text>One Level Up</text>
<schedule1></schedule1>
<schedule2></schedule2>
<schedule3></schedule3>
<reference1></reference1>
<reference2></reference2>
<reference3></reference3>
<description>Five Levels Down</description>
<imageCollaspe>images/closedfolder.png</imageCollaspe>
<imageExpand>images/openfolder.png</imageExpand>
<children>
<key id='1'>
<hilight>Yellow</hilight>
```

TABLE 2-continued

Portion of an exemplary XML file.

```
<text>Z-ZZ-999-01</text>
<schedule1></schedule1>
        <schedule2></schedule2>
<schedule3></schedule3>
<reference1></reference1>
<reference2></reference2>
<reference3></reference3>
<description>Master Data Set Up</description>
<imageCollaspe>images/closedfolder.png</imageCollaspe>
<imageExpand>images/openfolder.png</imageExpand>
<children>
<key id='2'>
<hilight>None</hilight>
<text>Z-ZZ-999-02</text>
<schedule1></schedule1>
<schedule2></schedule2>
<schedule3></schedule3>
<reference1></reference1>
<reference2></reference2>
<reference3></reference3>
<description>Procurement Direct</description>
<imageCollaspe>images/closedfolder.png</imageCollaspe>
<imageExpand>images/openfolder.png</imageExpand>
```

XML follows a tree design, so once the XML document has been parsed by the XML parser, inherent to the browser, a source tree is produced, such as that shown in Table 3.

TABLE 3

XML source tree.

```
<?xml version="1.0" ?>
- <tree>
  - <key id="0">
      <hilight>None</hilight>
      <text>One Level Up</text>
      <schedule1 />
      <schedule2 />
      <schedule3 />
      <reference1 />
      <reference2 />
      <reference3 />
      <description>Five Levels Down</description>
      <imageCollaspe>images/closedfolder.png</imageCollaspe>
      <imageExpand>images/openfolder.png</imageExpand>
    - <children>
      - <key id="1">
          <hilight>Yellow</hilight>
          <text>Z-ZZ-999-01</text>
          <schedule1 />
          <schedule2 />
          <schedule3 />
          <reference1 />
          <reference2 />
          <reference3 />
          <description>Master Data Set Up</description>
          <imageCollaspe>images/closedfolder.png</imageCollaspe>
          <imageExpand>images/openfolder.png</imageExpand>
        - <children>
            ⊞ <key id="2">
            + <key id="5">
          </children>
        </key>
      </children>
    </key>
  </tree>
```

However, a transformation expressed in XSLT describes rules for transforming a source tree into a result tree. The transformation is achieved by associating patterns with templates. A pattern is matched against elements in the source tree. A template is instantiated to create part of the result tree. The result tree is separate from the source tree. The structure of the result tree can be completely different from the structure of the source tree. In constructing the result tree, elements from the source tree can be filtered and reordered, and arbitrary structure can be added. A transformation expressed in XSLT is called a style sheet. This is because, in the case when XSLT is transforming into the XSL formatting vocabulary, the transformation functions as a style sheet.

An exemplary result tree at this stage is shown in FIG. 10.

While the testing tools, methods and other embodiments of the invention have been described in detail with respect to specific aspects thereof, it will be appreciated that those skilled in the art, upon attaining an understanding of the foregoing, may readily conceive of alterations to, variations of and equivalents to these testing tools and methods. Accordingly, the scope of the present invention should be assessed as that of the appended claims and any equivalents thereto.

We claim:

1. A method for testing a complex software system, wherein the complex software system has interrelated system programs, the method comprising the steps of:
   determining linkages between interrelated system programs using an automated multidimensional traceability matrix;
   identifying a change in one or more of the interrelated system programs;
   applying the automated multidimensional traceability matrix by using a graphical user interface that graphically displays information pertaining to a selected test scenario pertaining to the identified change, wherein the graphical user interface is adapted to display other test scenarios linked by two or more levels through at least one of dependencies and tributaries and wherein the graphical user interface is adapted to display linkages across three or more levels of dependency;
   executing one or more test scenarios associated with the interrelated system programs that may be affected by the change; and
   evaluating the results of the executed test scenarios, wherein the results include at least one of a list of dependencies and tributaries for the identified interrelated system programs and a list of test scenarios that invoke the identified interrelated system programs.

2. The method of claim 1, wherein the step of identifying a change in one or more of the interrelated system programs comprises an electronic tool that detects a change in an executable file.

3. The method of claim 1, wherein the step of identifying a change in one or more of the interrelated system programs comprises-manually entering information about the change.

4. The method of claim 1, wherein the step of evaluating the results of the executed test scenarios comprises manually comparing output information to previously generated output information from the test scenarios prior to the change.

5. The method of claim 1, wherein the step of evaluating the results of the executed test scenarios comprises comparing output information to previously generated output information from the test scenarios prior to the change using a computer.

6. The method of claim 1, wherein the method is applied for implementation of SAP R/3, and the method further comprises a step of using a computer assisted test tool to automatically execute selected scripts.

7. The method of claim 1, wherein the complex software system comprises software from at least one vendor interfaced with legacy software written by at least one other party.

8. The method of claim 1, wherein the complex software system is an ERP system.

9. The method of claim 1, further comprising a step of auditing changes in the complex software system and documentation associated with the complex software system.

10. The method of claim 1, wherein the graphical user interface comprises a Web-based display featuring hyperlinks for the displayed test scenarios.

11. A method of selecting a subset of test cases from a body of test cases for testing the performance of a complex software systems, each complex software system comprising a plurality of software components, each test case being associated with at least one software component in the complex software systems and each test case being associated with a script providing a series of instructions to be executed by the complex software systems for the test case, the method comprising the steps of:
   a) displaying a graphical user interface to receive input information about dependencies and tributaries for the test cases and wherein the graphical user interface is adapted to display the dependencies and tributaries linked by two or more levels;
   b) storing the input information in a database associated with an automated multidimensional traceability matrix;
   c) receiving a change notice indicating that one or more of the software components have been changed;
   d) applying the automated multidimensional traceability matrix to determine which of the test cases are linked via previously defined linkages to the one or more of the software components that have been changed;
   e) displaying information using a graphical user interface that graphically displays which test cases are linked to the one or more of software components that have been changed and wherein the graphical user interface is adapted to display the linkages by two or more levels;
   f) selecting all or a subset of the linked test cases;
   g) executing the scripts associated with the selected linked test cases; and
   h) storing actual results for the executed scripts for later comparison with expected results for the executed scripts.

12. The method of claim 11, wherein the step of displaying information to indicate which test cases are linked to the one or more of software components that have been changed further comprises the step of displaying information about linkages across three or more levels.

13. The method of claim 11, wherein the step of displaying information to indicate which test cases are linked to the one or more of software components that have been changed further comprises the step of displaying information about a number of dependency levels and a number of tributary levels, the number of tributary levels being greater than the number of dependency levels.

14. A method for user testing of updated software modules for complex software systems comprising a plurality of integrated software modules provided by one or more vendors, the method comprising the steps of:
   a) receiving a software update for a software module from a vendor;
   b) installing the software update on a server to provide an updated software module in the complex software system;
   c) applying an automated multidimensional traceability matrix to create a list of integrated software modules whose performance is linked to the updated software module, and then to create a list of the test cases associated with the integrated software modules whose performance is linked to the updated software module by using a graphical user interface that is adapted to graphically display linkages between the test cases and linkages between the integrated software modules by two or more levels;

d) selecting a subset of the test cases list in step (c) and executing associated test scripts; and e) evaluating the results of the executed associated test scripts, wherein the results include a list of dependencies and tributaries for the integrated software modules.

15. A method for modifying a complex software system comprising a plurality of interrelated software modules, each module being associated with one or more interrelated test cases for testing the performance of the software modules, the method comprising the steps of:

a) creating an automated multidimensional traceability matrix to electronically identify the relationships between the interrelated test cases, including dependency and tributary relationships, each test case in the automated multidimensional traceability matrix being linked to information about the associated interrelated software modules;

b) creating a baseline of performance results for all or a subset of the interrelated test cases associated with the complex software system according to one or more testing scenarios comprising predetermined input data and one or more scripts directing the execution of a plurality of tests cases;

c) creating a change in one or more of the interrelated software modules;

d) selecting a subset of the test cases for testing of the complex software system, wherein the electing is done with the aid of an interactive analysis roadmap based on information from the automated multidimensional traceability matrix, the analysis roadmap using a graphical user interface that is adapted to display the selected subset of test cases and to display the relationships between the test cases by two or more levels and wherein the graphical user interface is adapted to display the interrelated software modules that may be affected by the change;

e) executing all of or a subset of one or more test cases associated with the interrelated software modules that may be affected by the change to provide a set of post-change results; and f) comparing the post-change results with corresponding portions of the a baseline of performance.

16. The method of claim 15, wherein a plurality of servers exist that independently run complex software systems comprising original versions of the one or more integrated software modules that were changed, further comprising the step of updating the original versions with changed versions of the one or more integrated software modules that were changed.

17. The method of claim 16, wherein the step of updating further comprises the steps of creating a patch and executing the patch on the plurality of servers.

18. The method of claim 15, wherein the step of executing all of or a subset of one or more test scenarios further comprises the step of iteratively carrying out (1) execution of a subset of the test cases in a scenario, and (2) step (e), until the one or more test scenarios are completed.

19. The method of claim 15, wherein information pertaining to the testing and change in the software is archived.

20. The method of claim 15, further comprising the steps of determining if, in response to the change in the software, the Automated Traceability Matrix needs to be updated, and if so, updating the Automated Traceability Matrix prior to selecting a subset of the test cases for testing of the complex software system.

21. The method of claim 15, wherein testing of at least a portion of the selected test cases is done with automated testing tools.

22. The method of claim 21, wherein at least one parameter in input data for use with the selected test cases is automatically varied between a plurality of values during execution of the testing.

\* \* \* \* \*